US011005247B1

(12) United States Patent
Booyse et al.

(10) Patent No.: US 11,005,247 B1
(45) Date of Patent: May 11, 2021

(54) JUNCTION BOX INTERFACE CHASSIS AND PLUGGABLE MODULAR DEVICES

(71) Applicant: JPoint Innovation LLC, Layton, UT (US)

(72) Inventors: Anthony James Booyse, Layton, UT (US); Samuel Esteban Albornoz, Centerville, UT (US); Robert Thomas Berry, Layton, UT (US); Andrea Diane Booyse, Layton, UT (US)

(73) Assignee: JPoint Innovation LLC, Layton, UT (US)

( * ) Notice: Subject to any disclaimer, the term of this patent is extended or adjusted under 35 U.S.C. 154(b) by 0 days.

(21) Appl. No.: 17/095,715

(22) Filed: Nov. 11, 2020

(51) Int. Cl.
*H02G 3/00* (2006.01)
*H02G 3/12* (2006.01)
*H02G 3/18* (2006.01)
*H02G 3/16* (2006.01)

(52) U.S. Cl.
CPC .............. *H02G 3/12* (2013.01); *H02G 3/16* (2013.01); *H02G 3/18* (2013.01)

(58) Field of Classification Search
CPC .. H02G 3/12; H02G 3/16; H02G 3/18; H02G 3/14; H02G 3/085; H02G 3/086; H02G 3/088; H02B 1/38; H05K 5/0226; H05K 7/1417; E05D 7/10
See application file for complete search history.

(56) References Cited

U.S. PATENT DOCUMENTS

| | | |
|---|---|---|
| 2,397,688 A | 4/1946 | Osinski |
| 2,410,287 A | 10/1946 | Jaberg |
| 2,908,743 A | 10/1959 | Premoshis |
| 2,920,303 A | 1/1960 | Johnson |
| 2,946,977 A | 7/1960 | Sheldon |
| 3,038,141 A | 6/1962 | Chiuchiolo |
| 3,157,732 A | 11/1964 | Richards |
| 3,510,822 A | 5/1970 | Patterson |
| 3,609,647 A | 9/1971 | Castellano |
| 3,732,524 A | 5/1973 | Reed et al. |
| 3,879,101 A | 4/1975 | McKissic |
| 4,103,125 A | 7/1978 | Marrero |

(Continued)

FOREIGN PATENT DOCUMENTS

| | | |
|---|---|---|
| EP | 1386379 | 2/2004 |
| KR | 100758922 | 5/2004 |

*Primary Examiner* — Pete T Lee
(74) *Attorney, Agent, or Firm* — Phillips Winchester; Justin K. Flanagan

(57) ABSTRACT

Various components and subcomponents of a pluggable modular system for electrical junction boxes are described herein. In various embodiments, a jbox interface chassis is configured to be wired and fastened within an electrical junction box to provide a hot-swappable pluggable interface between the wires in the electrical junction box and each of a plurality of hot-swappable pluggable modular devices. The jbox interface chassis may include a front pluggable interface configured to electrically mate with a corresponding rear pluggable interface on a casing of each pluggable modular device. As an example, the jbox interface chassis may include a plurality of slots or holes to receive a corresponding plurality of blades or pins on the casing of each pluggable modular device. Additionally, device adapters are described herein to convert a wide variety of legacy electrical devices into pluggable modular devices.

10 Claims, 23 Drawing Sheets

(56) References Cited

U.S. PATENT DOCUMENTS

| | | | |
|---|---|---|---|
| 4,117,258 A | 9/1978 | Shanker | |
| 4,165,443 A | 8/1979 | Figart et al. | |
| 4,166,934 A | 9/1979 | Marrero | |
| 4,403,824 A | 9/1983 | Scott | |
| 4,485,282 A | 11/1984 | Lee | |
| 4,780,088 A | 10/1988 | Means | |
| 4,842,551 A | 6/1989 | Heimann | |
| 4,918,258 A | 4/1990 | Ayer | |
| 4,958,048 A | 9/1990 | Bell | |
| 5,178,350 A * | 1/1993 | Vink | H02G 3/18 220/3.4 |
| 5,399,806 A | 3/1995 | Olson | |
| 5,415,564 A | 5/1995 | Winter et al. | |
| 5,486,121 A | 1/1996 | Miller | |
| 5,500,487 A | 3/1996 | Leon | |
| 5,785,551 A | 7/1998 | Libby | |
| 5,925,850 A | 7/1999 | Park | |
| 6,309,248 B1 | 10/2001 | King | |
| 6,341,981 B1 | 1/2002 | Gorman | |
| 6,441,304 B1 * | 8/2002 | Currier | H02G 3/14 174/50 |
| 6,530,806 B2 | 3/2003 | Nelson | |
| 6,617,511 B2 | 9/2003 | Schultz | |
| 6,623,296 B2 | 9/2003 | Okamoto | |
| 6,664,467 B1 * | 12/2003 | de la Borbolla | H02G 3/128 174/503 |
| 6,767,245 B2 | 7/2004 | King | |
| 6,786,766 B1 | 9/2004 | Chopra | |
| 6,884,111 B2 * | 4/2005 | Gorman | H01H 11/0006 174/53 |
| 6,969,801 B2 | 11/2005 | Radosavljevic et al. | |
| 7,090,520 B2 | 8/2006 | Matsukawa et al. | |
| 7,090,530 B1 | 8/2006 | Dibble | |
| 7,160,147 B1 | 1/2007 | Stephan | |
| 7,179,992 B1 | 2/2007 | Packard et al. | |
| 7,312,396 B1 | 12/2007 | Gorman | |
| 7,321,120 B1 | 1/2008 | Gorman et al. | |
| 7,357,652 B1 | 4/2008 | Arenas et al. | |
| D571,729 S | 6/2008 | Kidman | |
| D588,539 S | 3/2009 | Byrne | |
| 7,544,941 B2 | 6/2009 | Gorman et al. | |
| 7,642,457 B2 | 1/2010 | Weeks et al. | |
| 7,666,010 B2 | 2/2010 | Arenas et al. | |
| 7,718,893 B2 | 5/2010 | Purves et al. | |
| D616,831 S | 6/2010 | Arenas et al. | |
| D618,627 S | 6/2010 | Arenas et al. | |
| 7,744,407 B1 | 6/2010 | Jerry | |
| 7,762,838 B2 | 7/2010 | Gorman | |
| 7,820,909 B2 | 10/2010 | Castaldo et al. | |
| 7,955,096 B2 | 6/2011 | Arenas et al. | |
| 8,028,408 B2 | 10/2011 | Gorman | |
| 8,029,301 B2 | 10/2011 | Kidman | |
| 8,044,299 B2 | 10/2011 | Weeks | |
| 8,058,552 B2 | 11/2011 | Kruse et al. | |
| 8,096,818 B2 | 1/2012 | Arenas et al. | |
| 8,105,107 B2 | 1/2012 | Gorman | |
| 8,109,785 B2 | 2/2012 | Kidman | |
| 8,242,362 B2 | 8/2012 | Castaldo et al. | |
| 8,243,402 B2 | 8/2012 | Benoit et al. | |
| 8,267,719 B1 | 9/2012 | Benoit et al. | |
| 8,299,359 B2 | 10/2012 | Alderson et al. | |
| 8,371,863 B1 | 2/2013 | Ganta et al. | |
| 8,388,371 B2 | 3/2013 | Gorman | |
| 8,435,055 B1 | 5/2013 | Bhosale | |
| RE44,546 E | 10/2013 | Gorman | |
| 8,568,152 B1 | 10/2013 | Weeks | |
| 8,602,799 B2 | 12/2013 | Ganta et al. | |
| 8,613,624 B2 | 12/2013 | Arenas et al. | |
| 8,649,133 B2 | 2/2014 | Benoit et al. | |
| 8,658,893 B1 | 2/2014 | Shotey et al. | |
| 8,678,856 B2 | 3/2014 | Gorman | |
| 8,737,025 B2 | 5/2014 | Weeks et al. | |
| 8,910,377 B2 | 12/2014 | Gorman | |
| RE45,430 E | 3/2015 | Gorman | |
| 9,030,789 B2 | 5/2015 | Benoit et al. | |
| 9,246,321 B2 | 1/2016 | Newill | |
| 9,301,410 B2 | 3/2016 | Rohmer et al. | |
| 9,620,945 B2 | 4/2017 | Rohmer et al. | |
| 9,640,962 B2 | 5/2017 | Hernandez Ramirez et al. | |
| 10,063,002 B2 | 8/2018 | Richardson et al. | |
| 10,069,235 B2 | 9/2018 | Blase et al. | |
| 10,078,786 B2 | 9/2018 | Richardson et al. | |
| 10,103,530 B2 | 10/2018 | Rohmer et al. | |
| 10,153,113 B2 | 12/2018 | Richardson et al. | |
| 10,153,602 B2 | 12/2018 | Wolfson | |
| 10,270,235 B2 | 4/2019 | Rohmer et al. | |
| 10,297,995 B2 | 5/2019 | Weeks et al. | |
| 10,418,813 B1 | 9/2019 | King | |
| 10,530,597 B1 | 1/2020 | King | |
| 10,637,223 B2 | 4/2020 | Newill | |
| 10,699,131 B2 | 6/2020 | Richardson et al. | |
| 10,700,477 B1 | 6/2020 | Richardson et al. | |
| 10,727,731 B1 | 7/2020 | King | |
| 10,741,960 B2 | 8/2020 | Richardson et al. | |
| 10,862,286 B2 | 12/2020 | Rohmer et al. | |
| 10,862,288 B2 | 12/2020 | Newill | |
| 10,944,220 B1 | 3/2021 | Richardson et al. | |
| 2009/0194311 A1 | 8/2009 | Merrill | |
| 2018/0191517 A1 | 7/2018 | Emigh et al. | |
| 2018/0192496 A1 | 7/2018 | Stewart et al. | |
| 2019/0215184 A1 | 7/2019 | Emigh et al. | |
| 2020/0028335 A1 | 1/2020 | Emigh et al. | |
| 2020/0028734 A1 | 1/2020 | Emigh et al. | |
| 2020/0388995 A1 | 12/2020 | Emigh et al. | |

* cited by examiner

JUNCTION BOX INTERFACE CHASSIS AND PLUGGABLE MODULAR DEVICES

TECHNICAL FIELD

The present disclosure generally relates to electrical junction boxes, smart devices, sensors, outlets, chargers, and the like.

DETAILED DESCRIPTION

Figure 1:
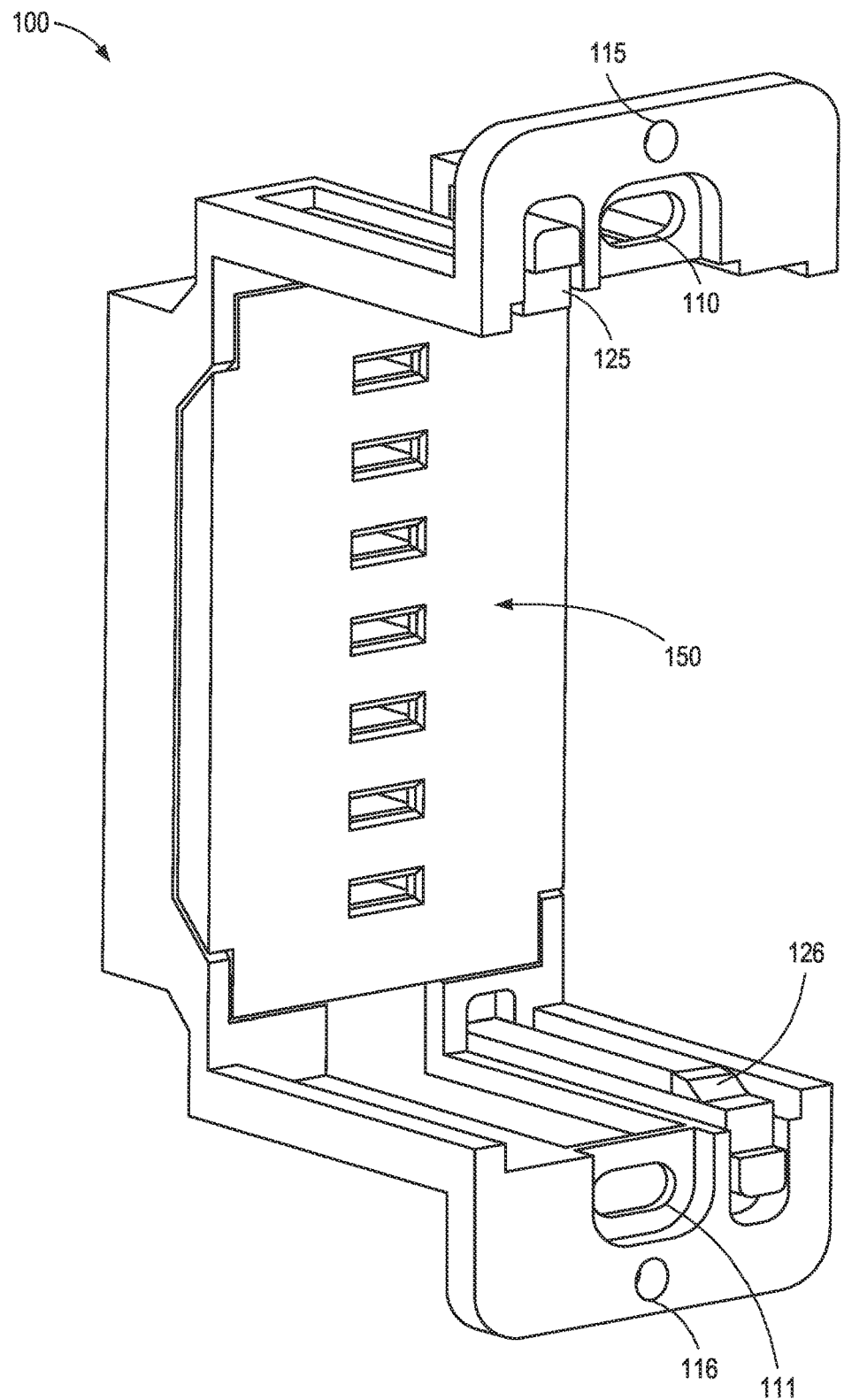
FIG. 1 illustrates an example jbox interface chassis for installation in an electrical junction box, according to one embodiment.

The present disclosure describes various embodiments, systems, apparatuses, and methods that relate to junction box (jbox) interface chassis and pluggable modular devices. For example, the present disclosure describes variations of jbox interface chassis for installation in an electrical junction box, also known as a junction box, jbox, or J-box. The various embodiments of the jbox interface chassis include features for securing the jbox interface chassis to the junction box. The various embodiments of the jbox interface chassis also include an electrical interface for connecting wires in the junction box to electrical conductors on the jbox interface chassis and a corresponding rear pluggable interface electrically connecting pluggable modular devices. The various embodiments of the jbox interface chassis may also include locking features to selectively secure an installed pluggable modular device. In various embodiments, the locking features may be selectively actuated to release an installed pluggable modular device.

Various embodiments of pluggable modular devices include an electrical device with a pluggable device back for interchangeable and selective installation within a jbox interface chassis. A pluggable device adapter may be connected to legacy electrical devices to convert such legacy devices to pluggable modular devices for selective installation within a jbox interface chassis. In some examples, pluggable device adapters include electrical interfaces, such as conductor tabs, to electrically interface with legacy electrical devices.

Examples of pluggable modular devices (or legacy devices to which pluggable device adapters can be affixed) include, but are not limited to, a smoke detector, a carbon monoxide detector, a sensor, a doorbell chime, an AC to DC converter, an AC to AC converter, an LED light, a magnetic charging interface, a wireless charging interface, a wireless access point, a WiFi repeater, a cell phone signal repeater, a Bluetooth transmitter, a wireless network interface, a power monitor, a speaker, a fan, a switch, an outlet, a camera, a microphone, a voice assistant interface, a sleep monitor, a medical condition monitor, a temperature sensor, a projector, a holographic projection device, a wireless video transmitter, an infrared receiver, an infrared transmitter, a touch screen, a video screen, a battery charger, a removable portable speaker charger, a removable light charger, sensors or transmitters for enhancing augmented reality or virtual reality, a deodorizer, an air freshener, a mechanical hook, a thermostat interface, a communication port, audio-video ports, motion sensors, timers, smart home interface devices, and/or various combinations of any of the foregoing.

For example, a jbox interface chassis may include one or more fastener interfaces to facilitate the attachment and securing of the jbox interface chassis within an electrical junction box. For example, the jbox interface chassis may include holes or apertures to receive screws that can be screwed into threaded receptacles of an electrical junction box. The jbox interface chassis may further include a rear wire interface to which wires within the jbox interface chassis may be attached. For example, the rear wire interface may include screw terminals, wire-lock holes to receive and retain each wire within the electrical junction box, wires for attachment via wire nuts, solderable connections, and/or the like.

The jbox interface chassis provides an electrical connection between each of the wires in the electrical junction box and a front pluggable interface configured to receive a corresponding rear pluggable interface of various pluggable modular devices, as described in greater detail below. The jbox interface chassis may further include one or more retainer tabs configured to selectively retain an inserted pluggable modular device. In various embodiments, the retainer tabs may be manually actuated without the use of tools to selectively release a retained pluggable modular device so that it can be removed from the jbox interface chassis.

The pluggable interface, including the front pluggable interface of the jbox interface chassis and the rear pluggable interface on each pluggable modular device, may include corresponding slots and blades, corresponding pins and holes, a multi-pin cable interface, pressure contacts, wireless contacts, or the like. In various embodiments, the female slots or holes are included on the front pluggable interface of the jbox interface chassis such that a user can safely contact the exposed surfaces of an installed jbox interface chassis without fear of electrical shock. In another embodiment, the front pluggable interface may include a wireless power transfer interface, a wireless communication interface, and/or a wireless control interface for receiving instructions for the interconnection of the wires in the electrical junction box. In embodiments in which the jbox interface chassis includes a wireless power, communication, or control interface (a "wireless" front pluggable interface), each of the pluggable modular devices may include a corresponding rear pluggable interface, which may be referred to as a wireless rear pluggable interface.

According to such embodiments, pluggable modular devices may be hot-swappable into and out of an installed jbox interface chassis (e.g., the pluggable modular devices may be removed and installed without turning off the power to the wires in the electrical junction box). The pluggable modular device receives power, transmits communication signals, receives communication signals, and/or controls connections between the various wires in the electrical junction box via any of the various pluggable interfaces described herein, including the front pluggable interface of the jbox interface chassis and the corresponding rear pluggable interface on each pluggable modular device. As an example, a system that includes wireless pluggable interfaces may utilize inductive coupling, RFID, NFC, Bluetooth, capacitive coupling, and/or other wireless power transfer, wireless communication, and wireless control technologies.

For a single-pole electrical device, the jbox interface chassis may connect hot, neutral, and ground wires from the electrical junction box to a front pluggable interface. In such an embodiment, the front pluggable interface may include only three discrete pluggable ports. For three-way and four-way devices, such as three-way and four-way light switches, the jbox interface chassis may connect hot, neutral, ground, and one or more traveler wires to a front pluggable interface. In such an embodiment, the jbox interface chassis may include four or five discrete pluggable ports. In other embodiments, a standardized jbox interface chassis may be used that has three, four, five, six, seven, or even more discrete pluggable ports, regardless of the number of wires in the electrical junction box.

In some embodiments, the jbox interface chassis may connect AC electrical power from wires in the electrical junction box to the front pluggable interface. In some embodiments, the jbox interface chassis may additionally or alternatively connect DC electrical power and/or communication wires from the electrical junction box to the front pluggable interface.

Any of a wide variety of pluggable modular devices may be "plugged" into the front pluggable interface of the jbox interface chassis. Each pluggable modular device may include some type of external-facing electrical device. The external-facing electrical device may be, for example, a single-gang electrical device sized to fit within a jbox interface chassis installed in a single-gang of an electrical junction box. The electrical device is described as external-facing in that it interacts with or is accessible from outside of the electrical junction box. Numerous examples of external-facing electrical devices that can be embodied as pluggable modular devices are listed herein.

Each pluggable modular device may include a casing with a rear pluggable interface to provide electrical connections (including for AC power, DC power, electrical communications, optical communications, etc.) to the external-facing single-gang electrical device. In some embodiments, a device adapter may be used to convert existing or legacy electrical devices, such as single-gang light switches and single-gang outlet receptacles, into pluggable modular devices.

For example, a snap-on or screw-on casing or device back may be attached to a legacy electrical device. The casing may include conductor tabs, such as flexible or pronged conductor tabs, to electrically connect terminals of the legacy electrical device to a rear pluggable interface on the casing of the device adapter. Once the device adapter is mounted to the legacy electrical device, the combined device adapter and legacy electrical device function as a pluggable modular device that can be hot-swapped into and out of a jbox interface chassis.

In some embodiments, the casing may include pronged conductor tabs that are engaged by the screw terminals on a legacy electrical device as the casing is attached to the back of the legacy electrical device. In some embodiments, the casing may include access holes that allow a screwdriver or other tool to tighten the conductor screws on the legacy device against pronged conductor tabs in the casing of the adapter device. The casing may include any number of pronged conductor tabs strategically positioned to correspond to the conductor screws of any number of different legacy electrical devices. Some universal adapter devices may include flexible conductor tabs, rotatable or repositionable pronged conductor tabs, and/or other conductor tabs to interface with more than one type or brand of legacy electrical devices. Examples of legacy electrical devices include, but are not limited to, light switch devices and/or outlet receptacles.

A pluggable modular system may include a jbox interface chassis to be fastened within an electrical junction box and connected to the wires within the electrical junction box. The pluggable modular system may also include any number of hot-swappable modular devices that can be interchangeably plugged into the jbox interface chassis and removed from the jbox interface chassis. Once the jbox interface chassis is wired and secured within the electrical junction box, an average consumer can interchangeably swap pluggable modular devices into and out of the jbox interface chassis to change the functionality and/or upgrade the functionality as desired.

Many existing manufacturing techniques may be utilized to produce the various embodiments of jbox interface chassis, pluggable device adapters, and pluggable modular devices. Examples of suitable manufacturing techniques include, but are not limited to, three-dimensional printing and other additive manufacturing techniques, milling, machining, polymer casting, rotational molding, vacuum forming, injection molding, extrusion, blow molding, and other manufacturing techniques.

The various jbox interface chassis, pluggable device adapters, and pluggable modular devices may be designed, adapted, modified, and/or manufactured to conform to specific standards for interoperability with existing and legacy devices and components. For example, the jbox interface chassis described herein may have dimensions specifically selected to fit within existing or legacy electrical junction boxes, such as those conforming to the specifications set by the National Electrical Manufacturers Association (NEMA), the American National Standards Institute (ANSI), and/or the National Electric Code (NEC). For example, jbox interface chassis may be manufactured with dimensions conforming to the NEMA OS1 and/or NEMA OS2 standards or similar standards in foreign jurisdictions and countries. In various embodiments, the jbox interface chassis, pluggable device adapters, and/or pluggable modular devices may be manufactured in conformance with NEMA, ANSI, and/or NEC specifications and certified by organizations such as the Underwriters Laboratories (UL), Edison Testing Laboratories (ETL), Conformance European (CE), other Nationally Recognized Testing Laboratories (NRTL), or the like.

A wide variety of computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like.

A processor may include a special-purpose processing device, such as an application-specific integrated circuit (ASIC), programmable array logic (PAL), programmable logic array (PLA), a programmable logic device (PLD), a field programmable gate array (FPGA), or another customizable and/or programmable device. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

FIG. 1 illustrates an example jbox interface chassis 100 for installation in an electrical junction box, according to one embodiment. The example jbox interface chassis 100 includes fastener interfaces 110 and 111 in the form of apertures through which the shaft of a screw can pass and be threaded into the electrical junction box. The fastener interfaces 110 and 111 do not allow the head of the screw to pass through such that the jbox interface chassis 100 is retained in a fixed position within the electrical junction box. The example jbox interface chassis 100 also includes apertures 115 and 116 to facilitate the attachment of a faceplate, as commonly utilized in conjunction with both high-voltage and low-voltage electrical junction boxes.

The example jbox interface chassis 100 also includes retainer tabs 125 and 126 to selectively retain an inserted pluggable modular device, as illustrated and described below. The rear wire interface is not visible, but the front pluggable interface 150 is illustrated with seven example discrete pluggable ports in the form of slots to receive corresponding blades of a pluggable modular device.

Figure 2A:
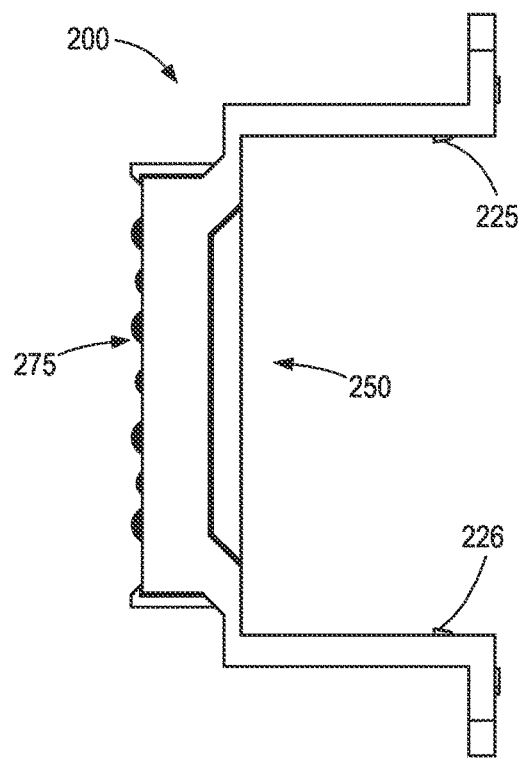
FIG. 2A illustrates a side view of an example jbox interface chassis for installation in an electrical junction box, according to one embodiment.

FIG. 2A illustrates a side view 200 of an example jbox interface chassis for installation in an electrical junction box, according to one embodiment. Protrusions of the upper retainer tab 225 and the lower retainer tab 226 are visible in the side view 200 of the example jbox interface chassis. Details of the front pluggable interface 250 are not visible in the side view 200. However, screws that are part of the rear wire interface 275 are partially visible.

Figure 2B:
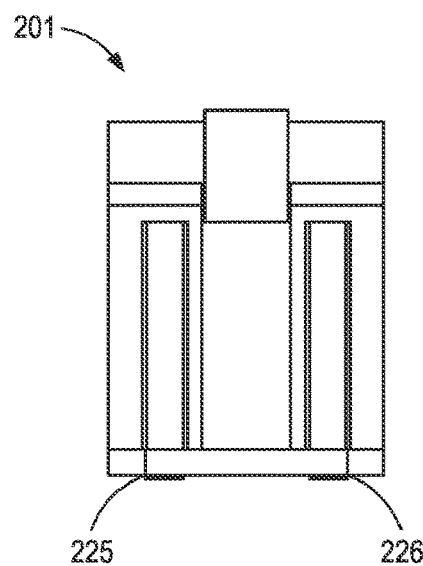
FIG. 2B illustrates a top view of the example jbox interface chassis of FIG. 2A, according to one embodiment.

FIG. 2B illustrates a top view 201 of the example jbox interface chassis of FIG. 2A, according to one embodiment. The top view 201 shows partial views of the upper retainer tab 225 and the lower retainer tab 226.

Figure 2C:
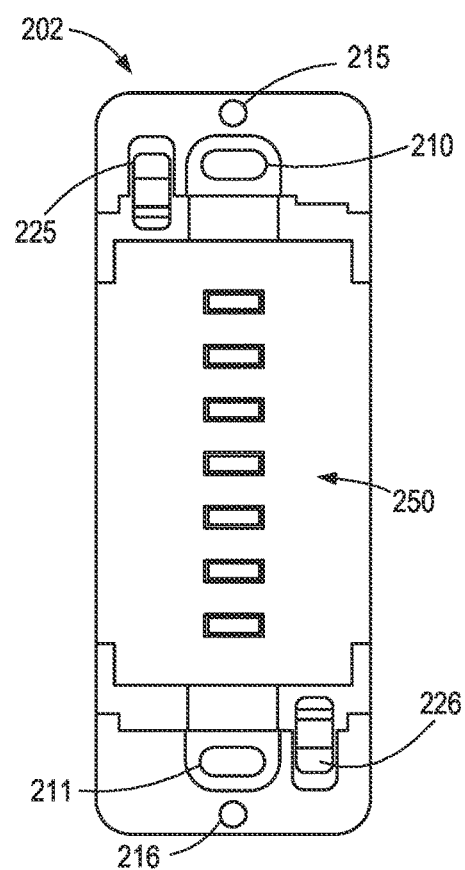
FIG. 2C illustrates a front view of the example jbox interface chassis of FIG. 2A, according to one embodiment.

FIG. 2C illustrates a front view 202 of the example jbox interface chassis of FIG. 2A, according to one embodiment. As illustrated, the jbox interface chassis may include apertures 215 and 216 for attaching a cover plate. Apertures 210 and 211 in the upper and lower portions of the jbox interface chassis form part of a fastener interface for securing and retaining the jbox interface chassis in a fixed position within an electrical junction box. Upper retainer tab 225 and lower retainer tab 226 operate to selectively retain and release pluggable modular devices. The front pluggable interface 250 includes seven discrete pluggable ports for electrically connecting each individual wire in the electrical junction box to a corresponding blade of a rear pluggable interface on a pluggable modular device.

Figure 2D:
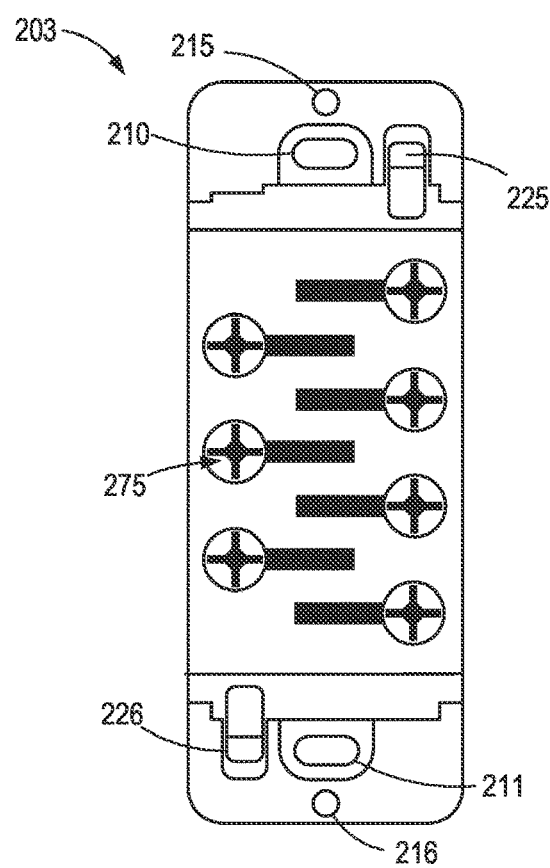
FIG. 2D illustrates a back view of the example jbox interface chassis of FIG. 2A, according to one embodiment.

FIG. 2D illustrates a back view 203 of the example jbox interface chassis of FIG. 2A, according to one embodiment. In the illustrated embodiment, the rear wire interface 275 includes a plurality of screws for attaching a corresponding plurality of wires within an electrical junction box to the front pluggable interface 250. In some embodiments, each screw of the rear wire interface 275 may be connected to one wire within the electrical junction box. Each screw of the rear wire interface 275 may electrically connect one wire within the electrical junction box to one slot of the front pluggable interface 250.

Figure 3A:
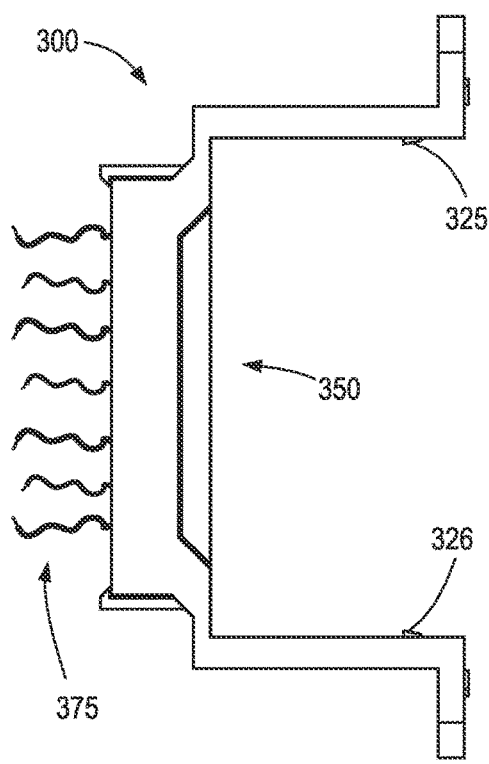
FIGS. 3A-3D illustrate views of another example jbox interface chassis for installation in an electrical junction box, according to an alternative embodiment.
Figure 3B:
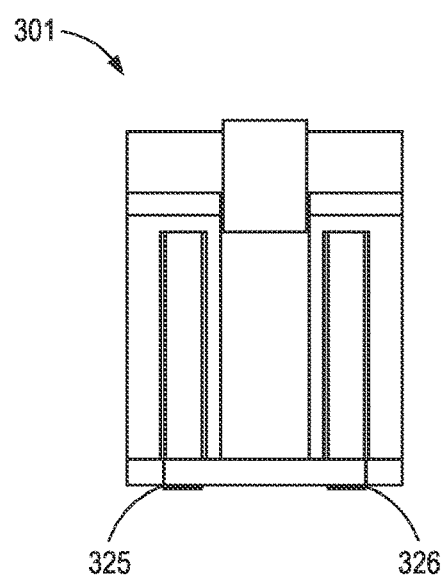
Figure 3C:
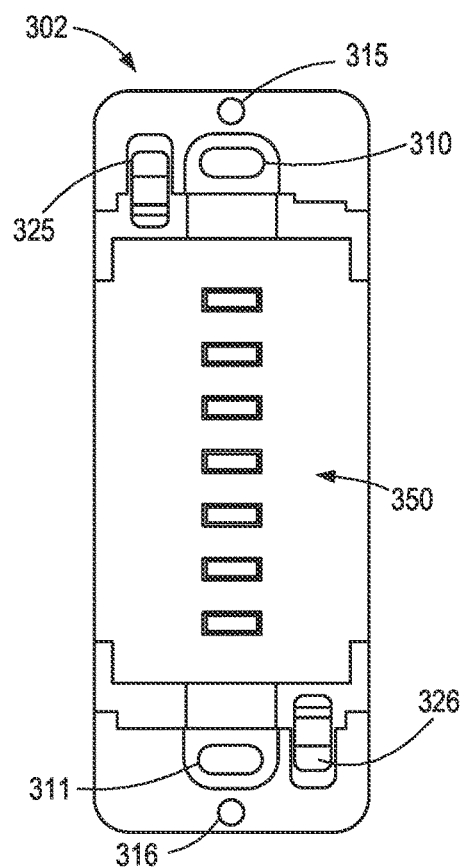
Figure 3D:
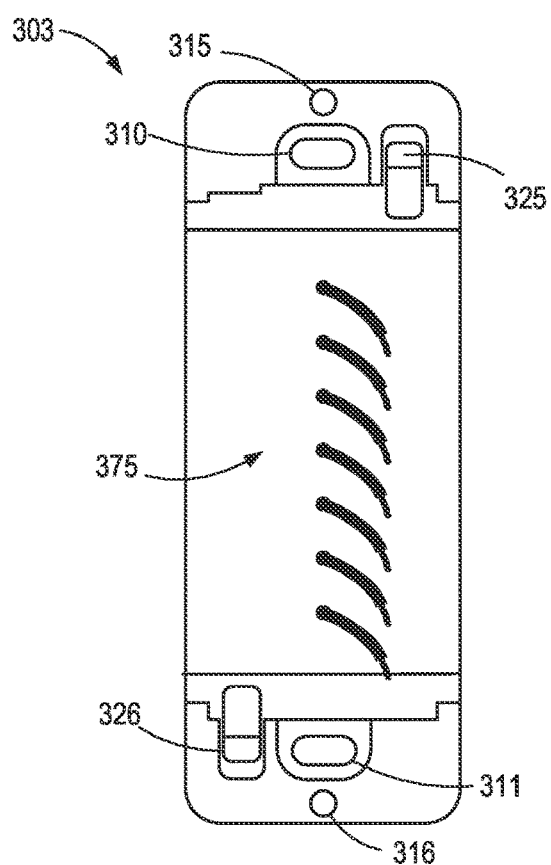
Figure 4A:
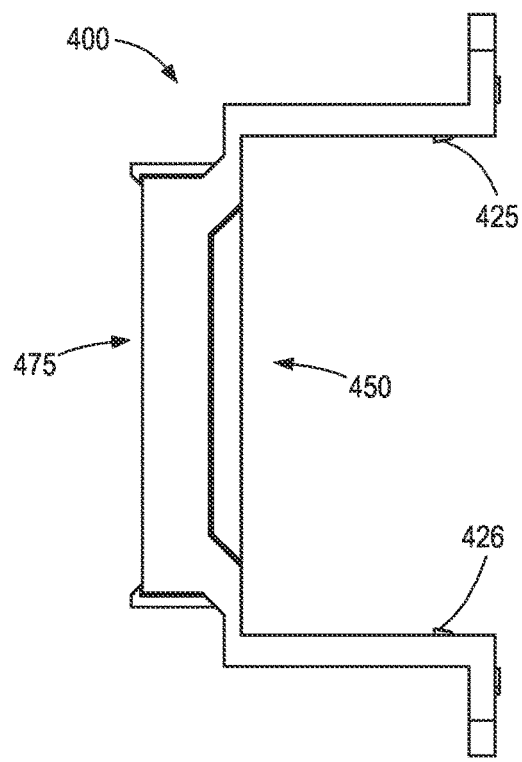
FIGS. 4A-4D illustrate views of another example jbox interface chassis for installation in an electrical junction box, according to another alternative embodiment.
Figure 4B:
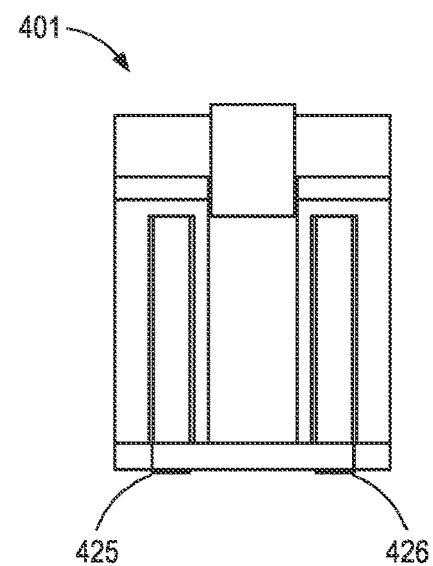
Figure 4C:
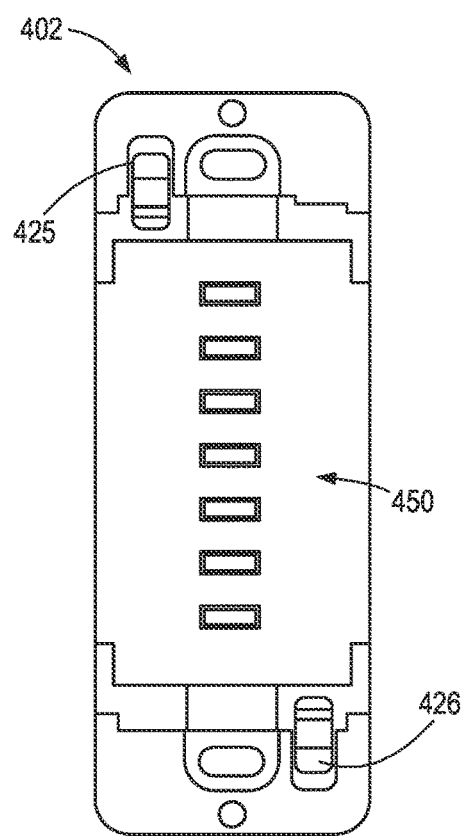
Figure 4D:
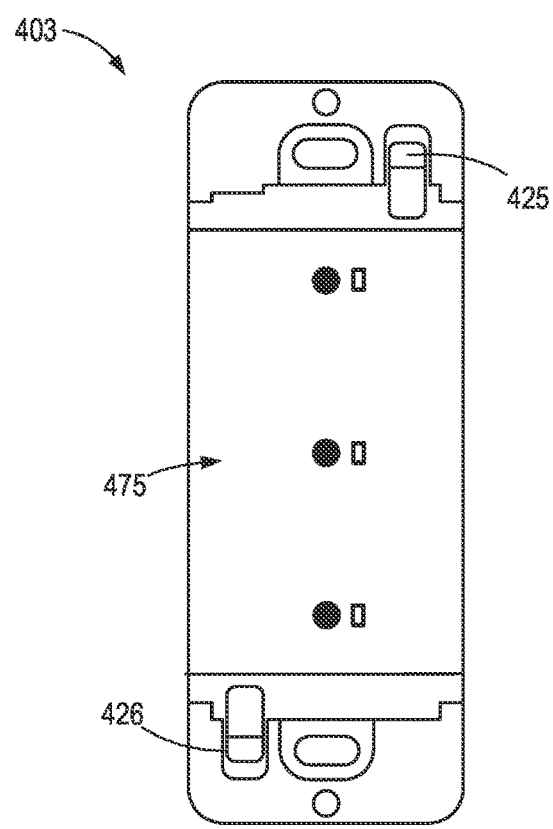
Figure 5A:
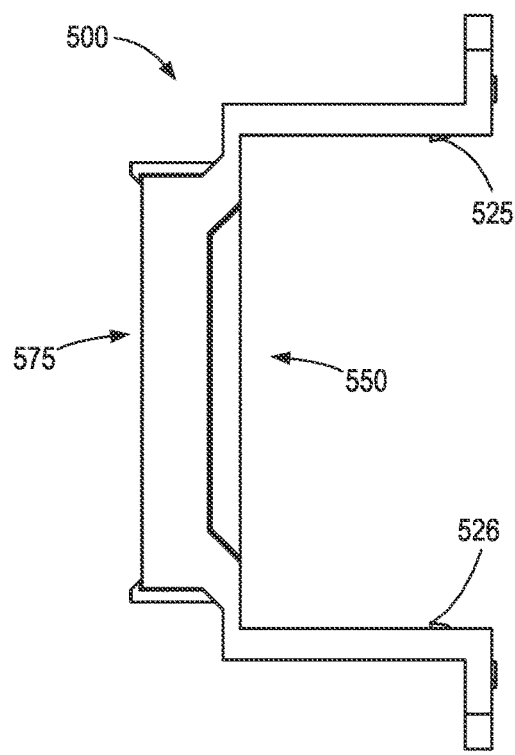
FIGS. 5A-5D illustrate views of another example jbox interface chassis for installation in an electrical junction box, according to another alternative embodiment.
Figure 5B:
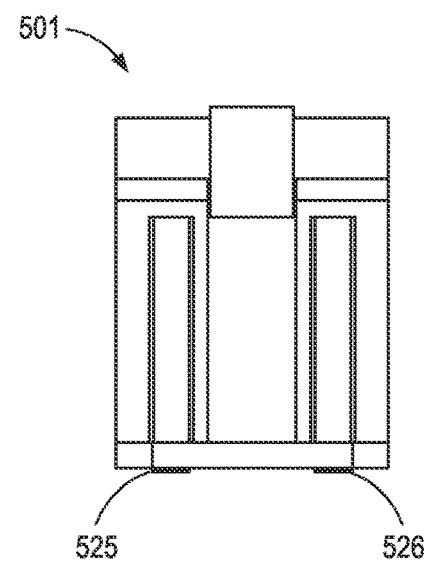
Figure 5C:
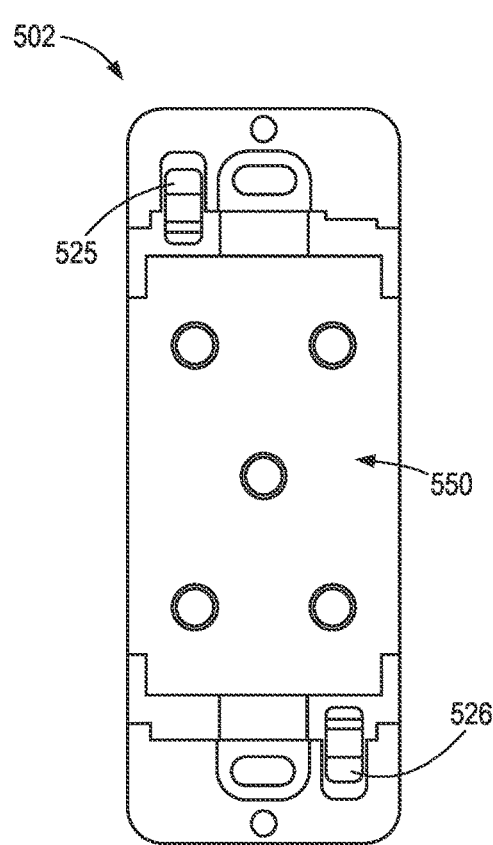
Figure 5D:
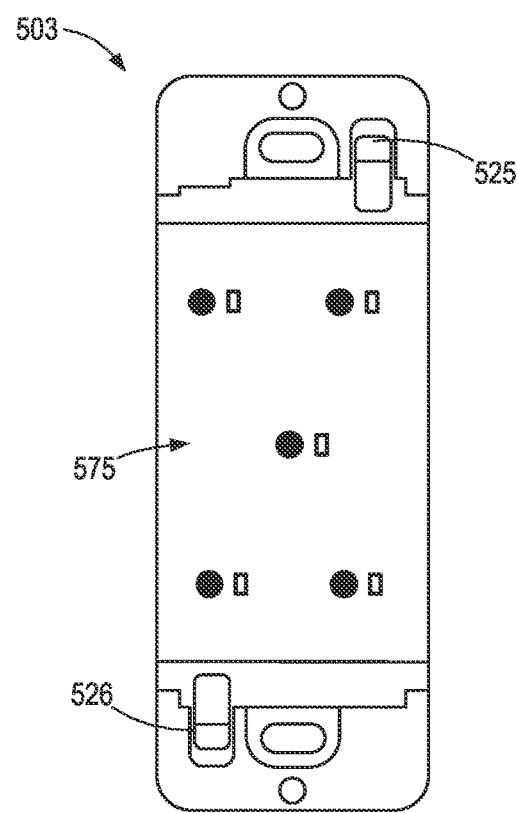

FIGS. 3A-3D illustrate views of another example jbox interface chassis for installation in an electrical junction box, according to an alternative embodiment. FIG. 3A illustrates a side view 300 of the example jbox interface chassis similar to the embodiments described in conjunction with FIGS. 2A-2D, but with a set of wires forming the rear wire interface 375. In some embodiments, the wires forming the rear interface 375 may be combined or bundled as part of a pigtail or electrical whip. The illustrated example jbox interface chassis of FIGS. 3A-3D includes an upper retainer tab 325, a lower retainer tab 326, a front pluggable interface 350, fastener interface apertures 310 and 311, and cover plate apertures 315 and 316 (FIG. 3D) to function as described in conjunction with other embodiments herein.

The top view 301 and the front view 302 of the jbox interface chassis are similar to the embodiments described in conjunction with FIGS. 2A-2D. The back view 303 of the example jbox interface chassis illustrates the wires extending from the jbox interface chassis as part of the rear wire interface 375. One or more of the wires of the rear wire interface 375 may be connected (e.g., via a wire nut) during the installation of the jbox interface chassis into an electrical junction box.

FIGS. 4A-4D illustrate views of another example jbox interface chassis for installation in an electrical junction box, according to another alternative embodiment. A side view 400 of the jbox interface chassis shows an upper retainer tab 425 and a lower retainer tab 426, as described in conjunction with other embodiments herein. Details of the front pluggable interface 450 and the rear wire interface 475 are not shown in the side view 400 or the top view 401, but are shown in front view 402 and back view 403, respectively.

Three of the slots of the front pluggable interface 450 shown in the front view 402 are connected to the locking wire connections shown as part of the rear wire interface in the back view 403 of the jbox interface chassis. The rear wire interface 475 may include locking wire connections, each of which includes a hole to receive and retain a wire. A mechanical release proximate each hole can be depressed to release the wire from the hole.

FIGS. 5A-5D illustrate views of another example jbox interface chassis for installation in an electrical junction box, according to another alternative embodiment. Similar to previous embodiments, the side view 500 of the example jbox interface chassis includes an upper retainer tab 525 and a lower retainer tab 526. A rear wire interface 575 connects to wires within the electrical junction box for electrical passthrough to the front pluggable interface 550. The upper retainer tab 525 and a lower retainer tab 526 are also visible in each of the top view 401, the front view 502, and the back view 503.

As illustrated in the front view 502 of the jbox interface chassis, the example embodiment includes a front pluggable interface 550 with five holes. Each of the five holes of the front pluggable interface 550 corresponds to a locking wire connection hole of the rear wire interface 575.

Figure 6B:
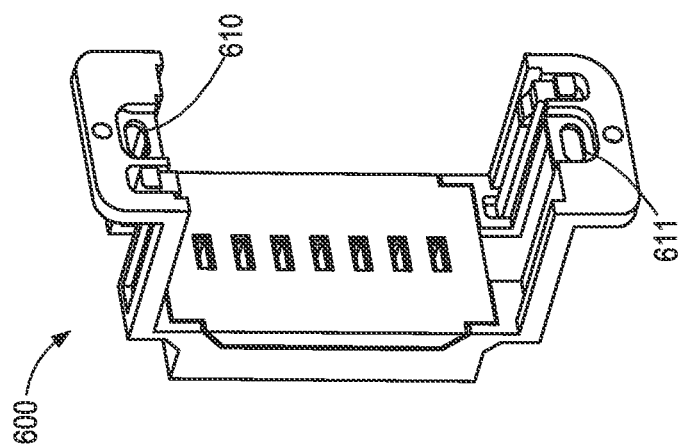
FIG. 6B illustrates an example jbox interface chassis for installation in the electrical junction box, according to one embodiment.
Figure 6A:
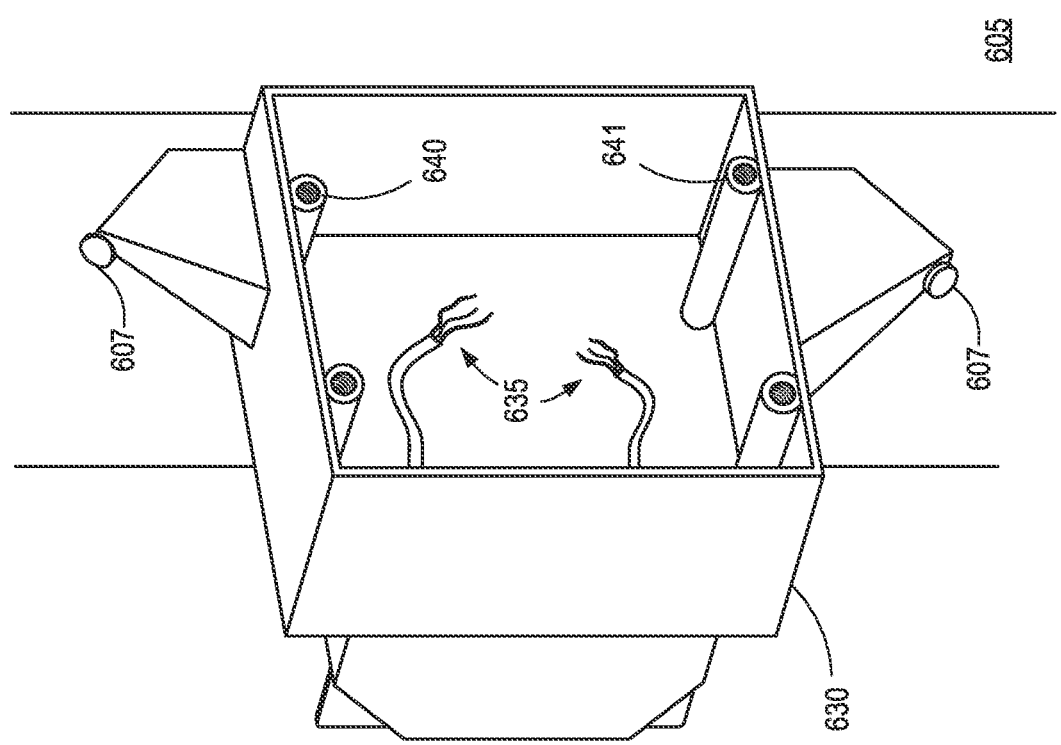
FIG. 6A illustrates an example electrical junction box installed to a stud of a wall, according to one embodiment.

FIG. 6A illustrates an example electrical junction box 630 installed to a stud 605 of a wall via nails 607, according to one embodiment. Wires 635 are visible within the electrical junction box 630. The electrical junction box 630 also includes threaded connection members 640 and 641.

FIG. 6B illustrates an example jbox interface chassis 600 for installation in the electrical junction box 630 of FIG. 6A, according to one embodiment. The jbox interface chassis 600 includes apertures 610 and 611 as part of a fastener interface. Screws can be passed through apertures 610 and 611 and threaded into the threaded connection members 640 and 641 of the electrical junction box 630 of FIG. 6A.

Figure 7A:
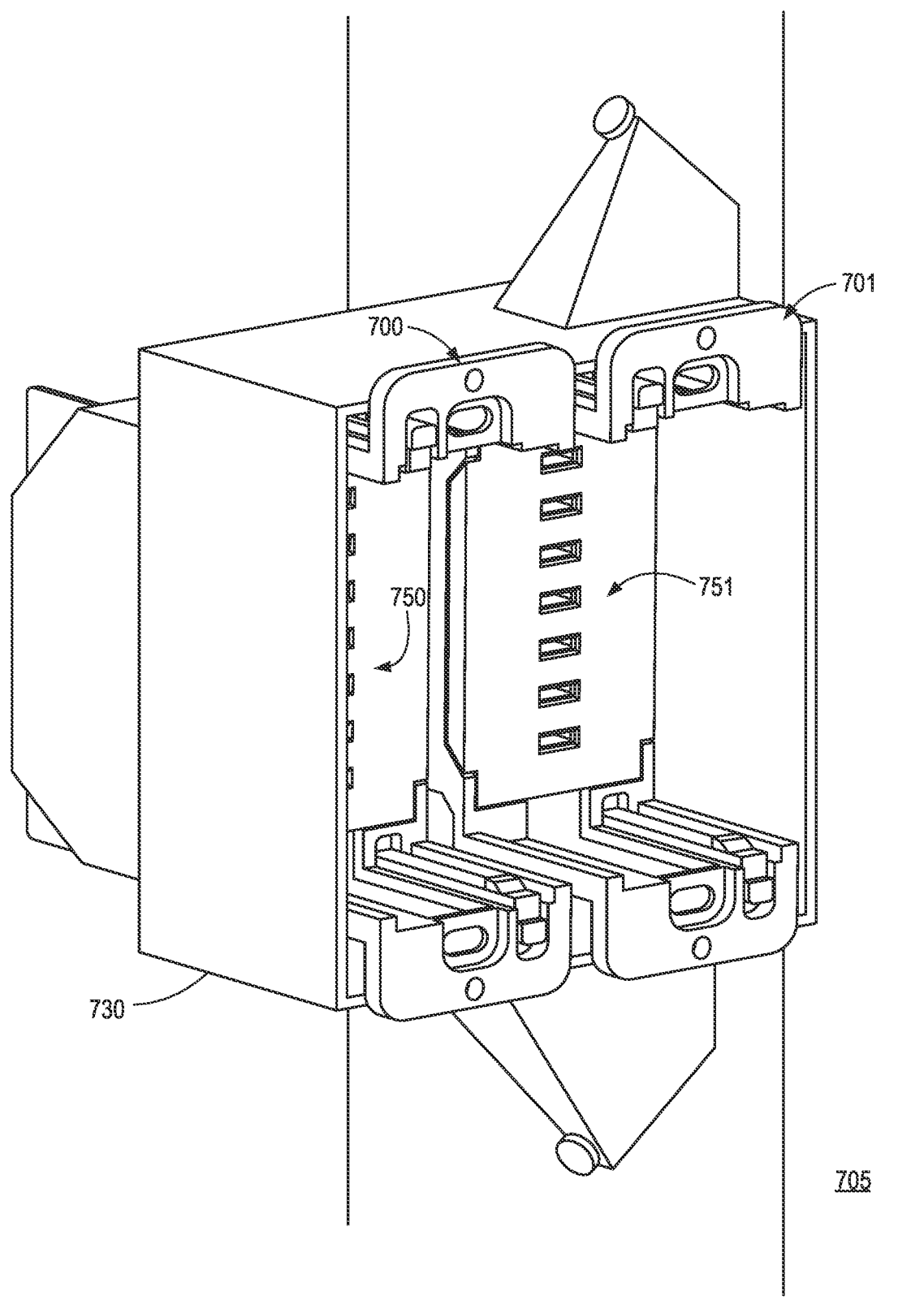
FIG. 7A illustrates two example jbox interface chassis installed in a double-gang electrical junction box attached to a stud of a wall, according to one embodiment.

FIG. 7A illustrates two example jbox interface chassis 700 and 701 installed in a double-gang electrical junction box 730 attached to a stud 705 of a wall, according to one embodiment. Each of the jbox interface chassis 700 and 701 includes a front pluggable interface to electrically connect wires within the electrical junction box 730 to the discrete pluggable ports of the front pluggable interfaces 750 and 751.

Figure 7B:
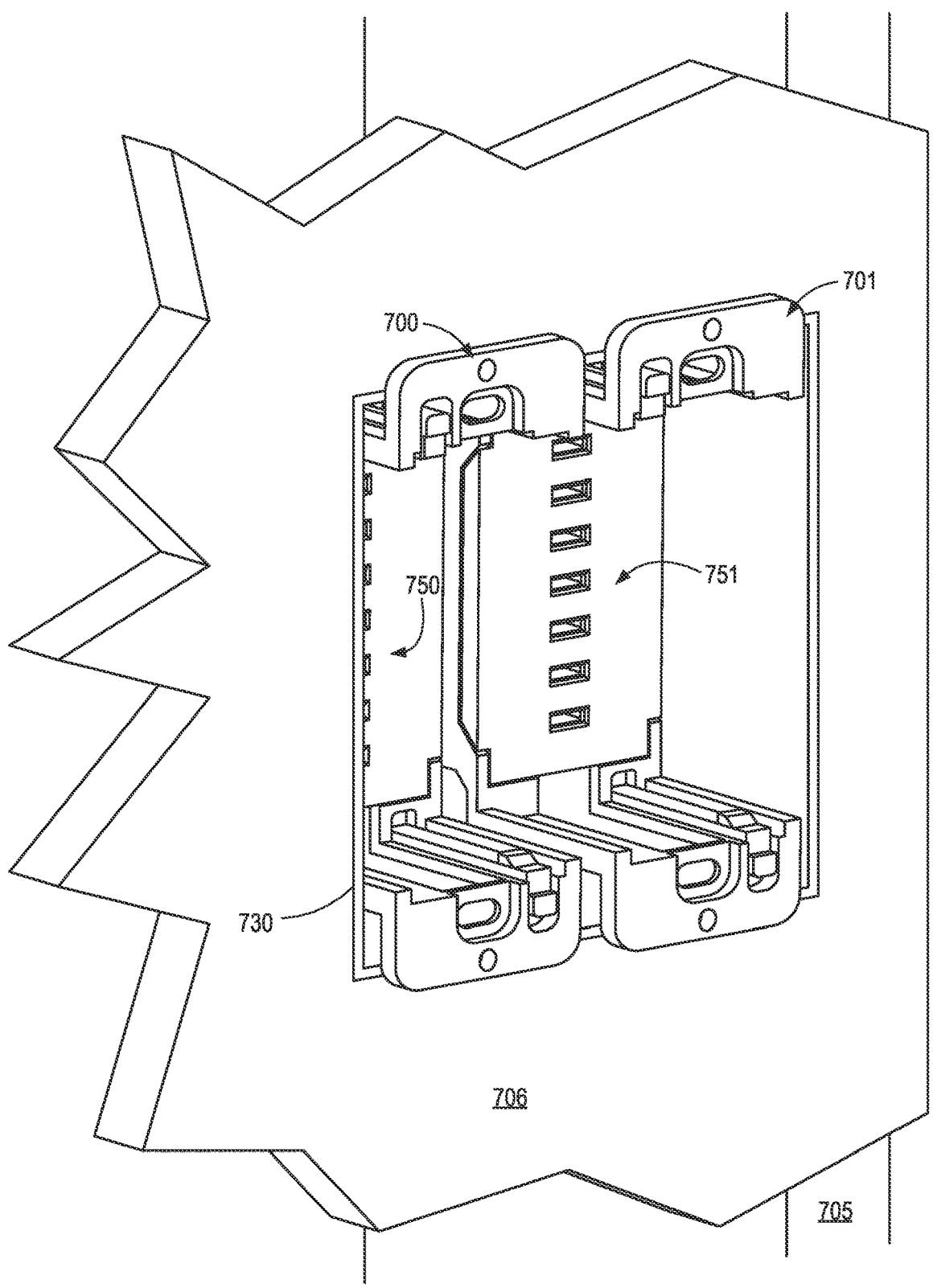
FIG. 7B illustrates the two example jbox interface chassis installed in a double-gang electrical junction box installed behind a wall, according to one embodiment.

FIG. 7B illustrates the two example jbox interface chassis 700 and 701 installed in a double-gang electrical junction box 730 installed behind a wall 706, according to one embodiment.

Figure 7C:
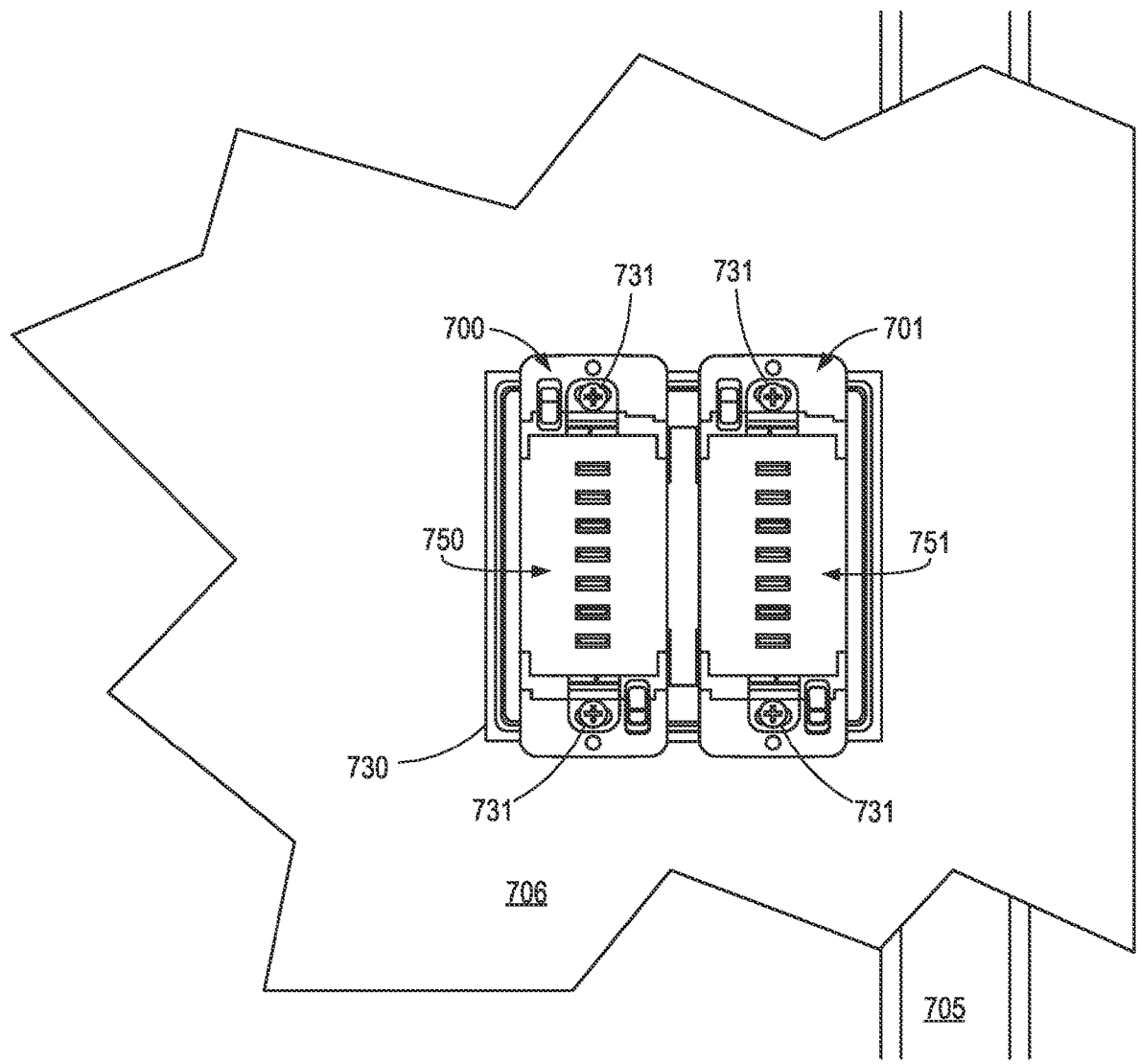
FIG. 7C illustrates a front view of the two example jbox interface chassis installed in a double-gang electrical junction box installed behind a wall, according to one embodiment.

FIG. 7C illustrates a front view of the two example jbox interface chassis 700 and 701 installed in a double-gang electrical junction box 730 installed behind the wall 706, according to one embodiment. As illustrated, each of the jbox interface chassis 700 and 701 is secured in a fixed position within the double-gang electrical junction box 730 via screws 731.

Figure 8:
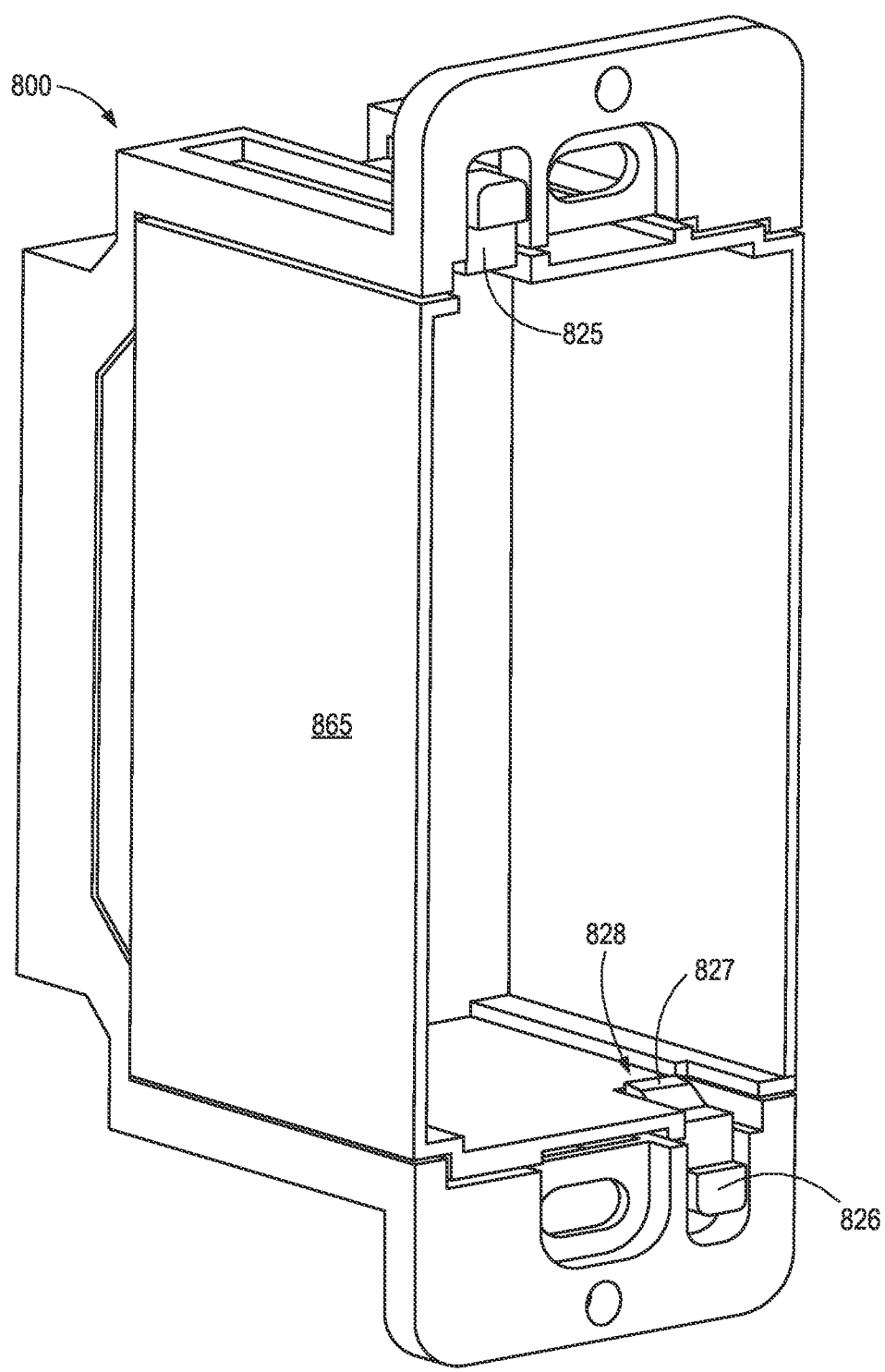
FIG. 8 illustrates an example of an empty pluggable device back installed in an example jbox interface chassis, according to one embodiment.

FIG. 8 illustrates an example of an empty pluggable device back 865 installed in an example jbox interface chassis 800, according to one embodiment. As illustrated, and upper retainer tab 825 and the lower retainer tab 826 retain the pluggable device back 865 within the jbox interface chassis 800. For example, a leading edge 827 of the lower retainer tab 826 engages a cutout 828 in the pluggable device back 865.

Figure 9:
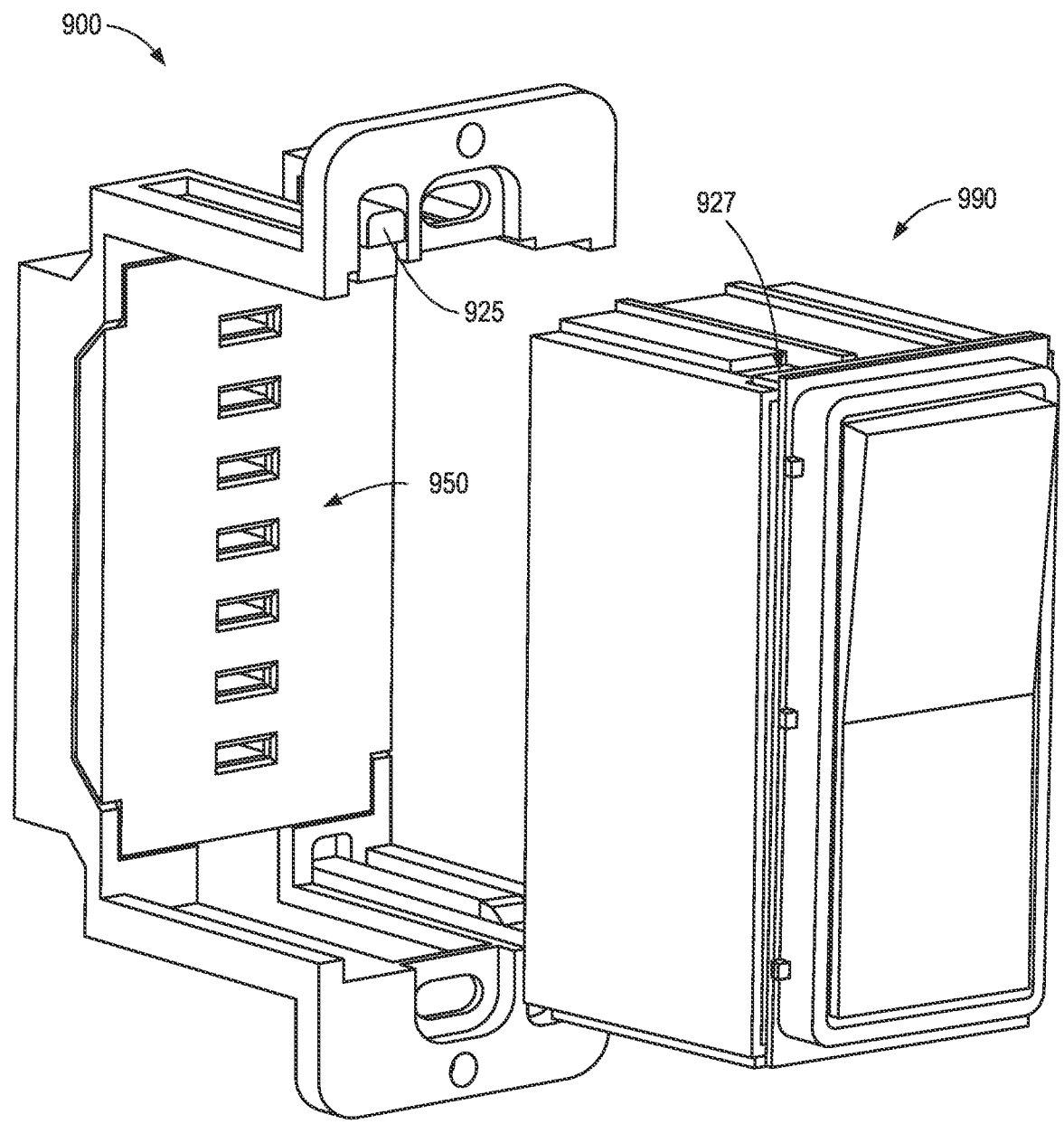
FIG. 9 illustrates an example pluggable modular device as a paddle switch with an integrated pluggable device back for installation in an example jbox interface chassis, according to one embodiment.

FIG. 9 illustrates an example pluggable modular device 990 as a paddle switch with an integrated pluggable device back for installation in an example jbox interface chassis 900, according to one embodiment. A rear pluggable interface of the pluggable modular device 990 electrically connects to the front pluggable interface 950 of the jbox interface chassis 900. The retainer tabs, including the upper retainer tab 925, of the jbox interface chassis 900 interact with the cutout 927 in the casing of the pluggable modular device 990 to retain the pluggable modular device 990 within the jbox interface chassis 900.

Figure 10A:
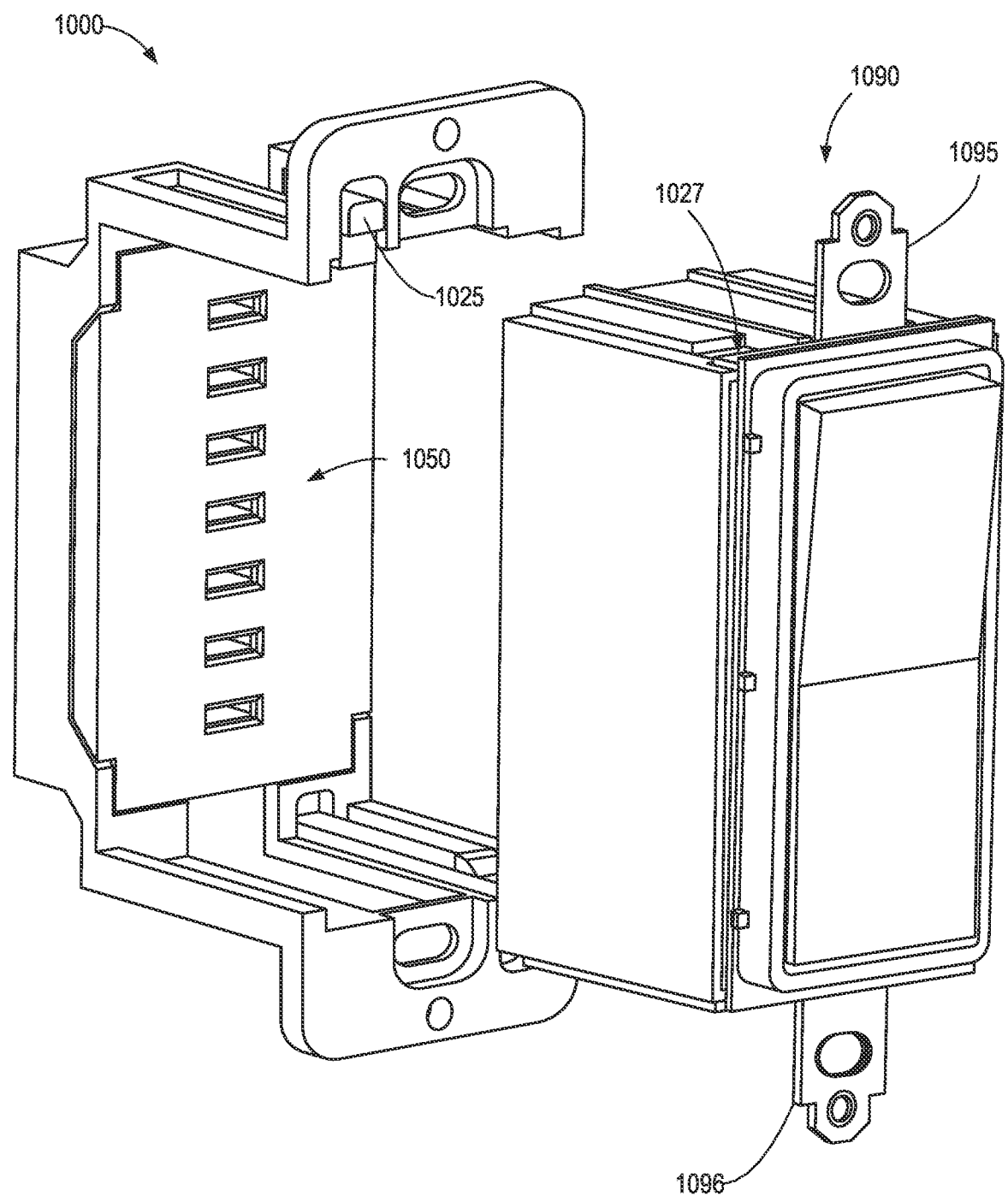
FIG. 10A illustrates an example pluggable modular paddle switch device with optional screw installation eyelets for installation in an example jbox interface chassis, according to one embodiment.

FIG. 10A illustrates an example pluggable modular paddle switch device 1090 with optional screw installation eyelets 1095 and 1096. Again, a rear pluggable interface (not shown) of the pluggable modular paddle switch device 1090 electrically connects to the front pluggable interface 1050 of the jbox interface chassis 1000. The retainer tabs, including the upper retainer tab 1025, of the jbox interface chassis 1000 interact with the cutout 1027 in the casing of the pluggable modular paddle switch device 1090 to retain the pluggable modular paddle switch device 1090 within the jbox interface chassis 1000.

Figure 10B:
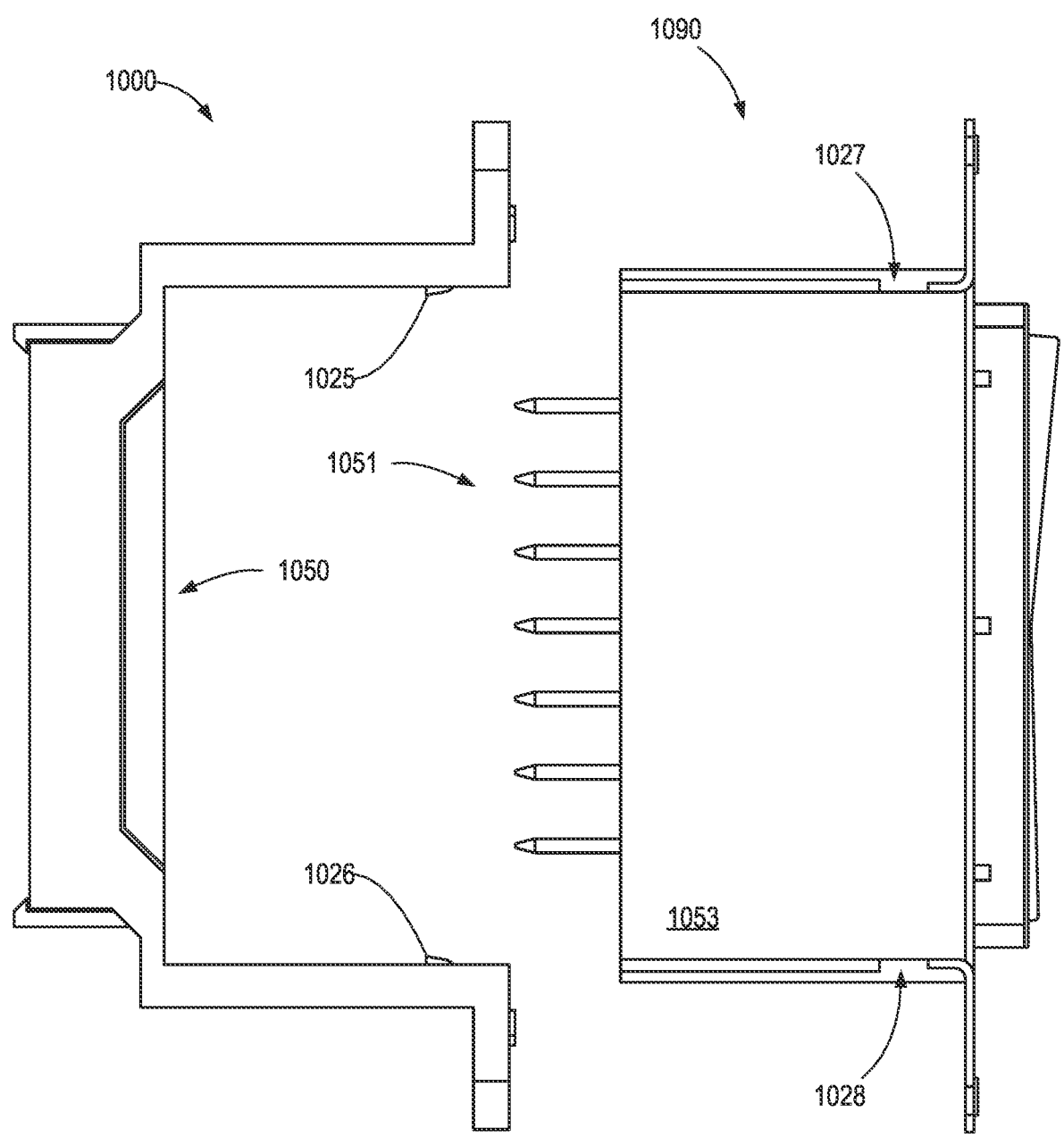
FIG. 10B illustrates a side view of the example pluggable modular paddle switch device, according to one embodiment.

FIG. 10B illustrates a side view of the example pluggable modular paddle switch device 1090, according to one embodiment. The rear pluggable interface 1051 on the casing 1053 of the pluggable modular paddle switch device 1090 engages the front pluggable interface 1050 of the jbox interface chassis 1000. Specifically, the front pluggable interface 1050 includes seven discrete pluggable ports (e.g., slots) to receive the corresponding seven blades of the rear pluggable interface 1051. In alternative embodiments, the number of discrete pluggable ports and the number of corresponding blades may be fewer or greater in number than the illustrated example.

Additionally, the upper retainer tab 1025 and the lower retainer tab 1026 selectively retain the pluggable modular paddle switch device 1090 by engaging the cutouts 1027 and 1028 as the pluggable modular paddle switch device 1090 is inserted into the jbox interface chassis 1000. In alternative embodiments, additional or fewer retainer tabs may be utilized. Furthermore, alternative retention mechanisms may be utilized to selectively retain and release pluggable modular devices within a jbox interface chassis.

Figure 10C:
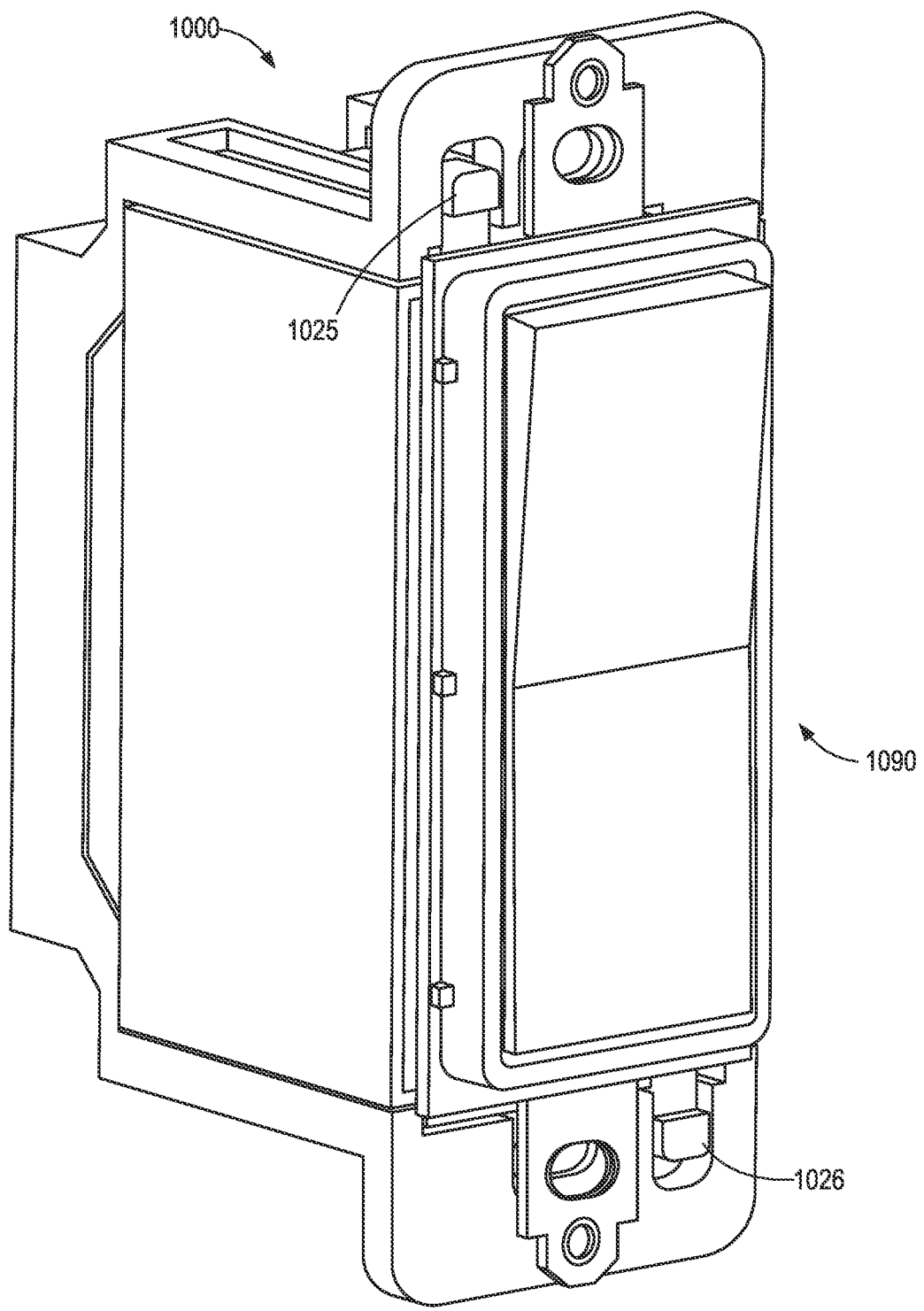
FIG. 10C illustrates the example pluggable modular paddle switch device attached to the example jbox interface chassis, according to one embodiment.

FIG. 10C illustrates the example pluggable modular paddle switch device 1090 retained within the example jbox interface chassis 1000 by the upper retainer tab 1025 and the lower retainer tab 1026.

Figure 10E:
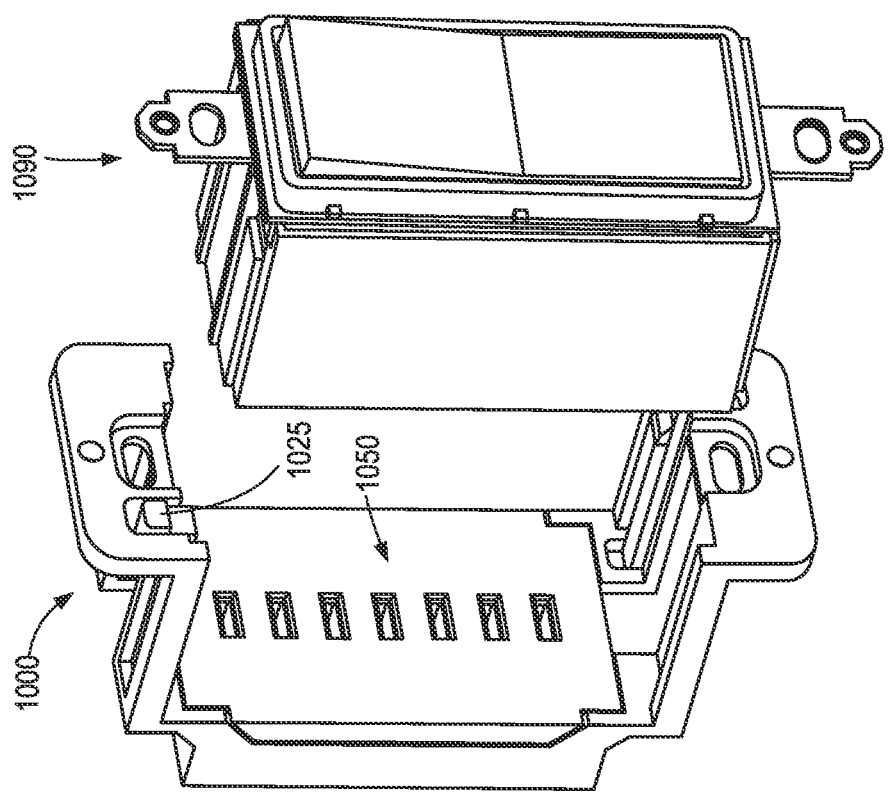
FIG. 10E illustrates the example pluggable modular paddle switch device removed from the example jbox interface chassis, according to one embodiment.
Figure 10D:
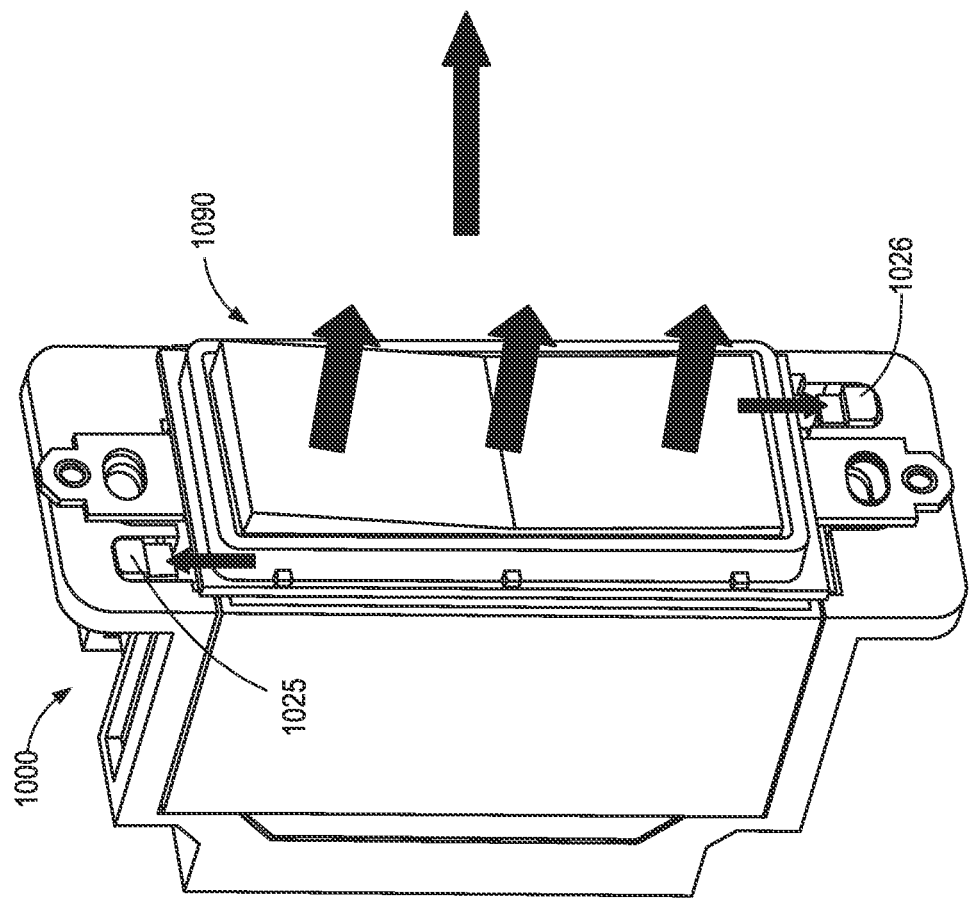
FIG. 10D illustrates the example pluggable modular paddle switch device being removed from the example jbox interface chassis, according to one embodiment.

FIG. 10D illustrates the example pluggable modular paddle switch device 1090 being removed from the example jbox interface chassis 1000, according to one embodiment. Arrows are used to illustrate manual force applied by a user during the removal process. Specifically, force is applied to each of the upper retainer tab 1025 and the lower retainer tab 1026 to disengage the respective leading edges (see 827 of FIG. 8) from the cutouts 1027 and 1028 (FIG. 10B). Force is then applied to extricate the pluggable modular paddle switch device 1090 from the jbox interface chassis 1000. As the pluggable modular paddle switch device 1090 is removed from the jbox interface chassis 1000, the rear pluggable interface 1051 (FIG. 10B) is electrically disconnected from the front pluggable interface 1050 (FIG. 10B) of the jbox interface chassis 1000.

FIG. 10E illustrates the example pluggable modular paddle switch device 1090 removed from the example jbox interface chassis 1000, according to one embodiment.

Figure 11A:
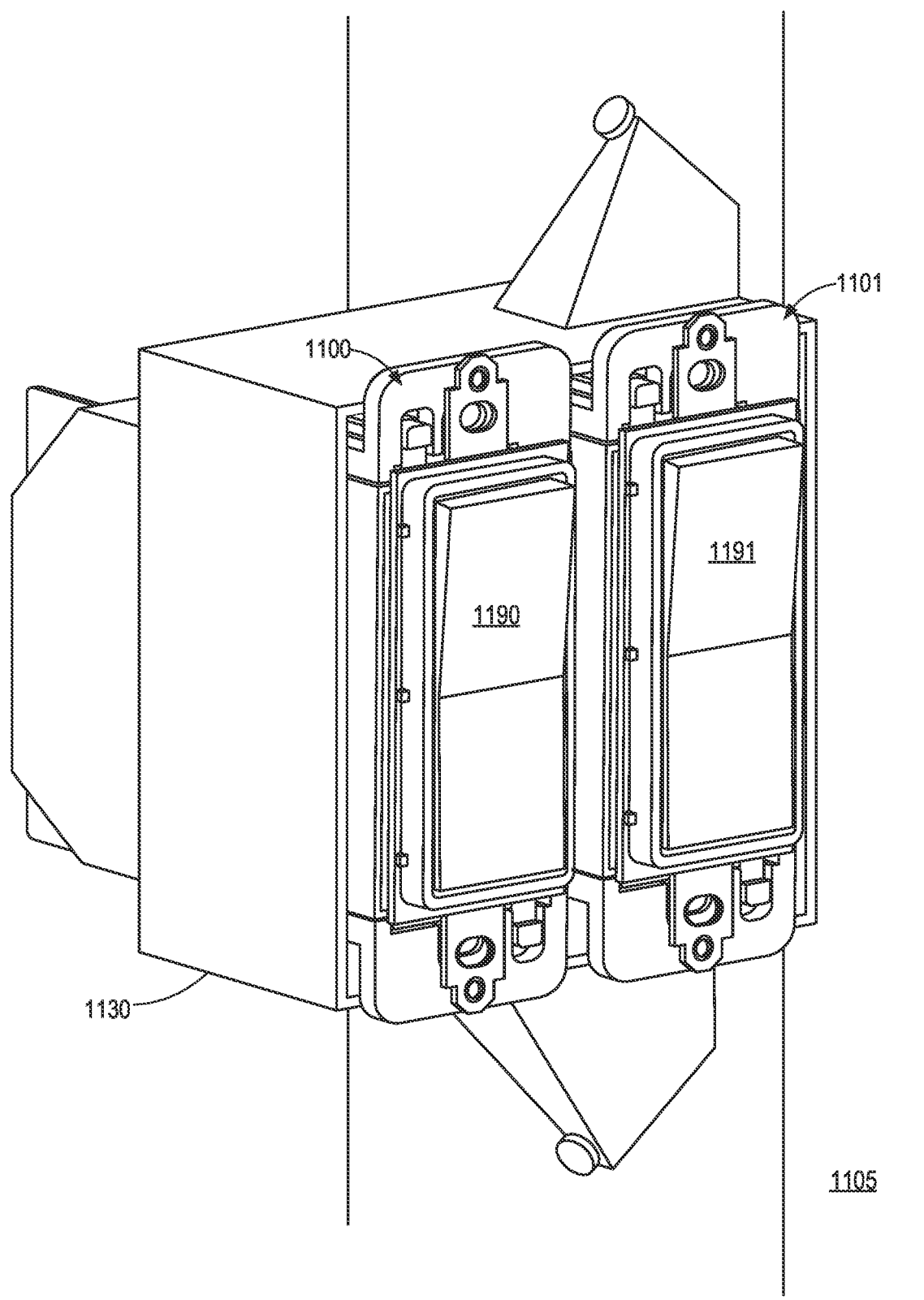
FIG. 11A illustrates two example pluggable modular paddle switch devices installed in the example jbox interface chassis within a double-gang electrical junction box, according to one embodiment.

FIG. 11A illustrates two example pluggable modular paddle switch devices 1190 and 1191 installed in jbox interface chassis 1100 and 1101 within a double-gang electrical junction box 1130, according to one embodiment. As illustrated, the electrical junction box 1130 is attached to a stud 1105.

Figure 11B:
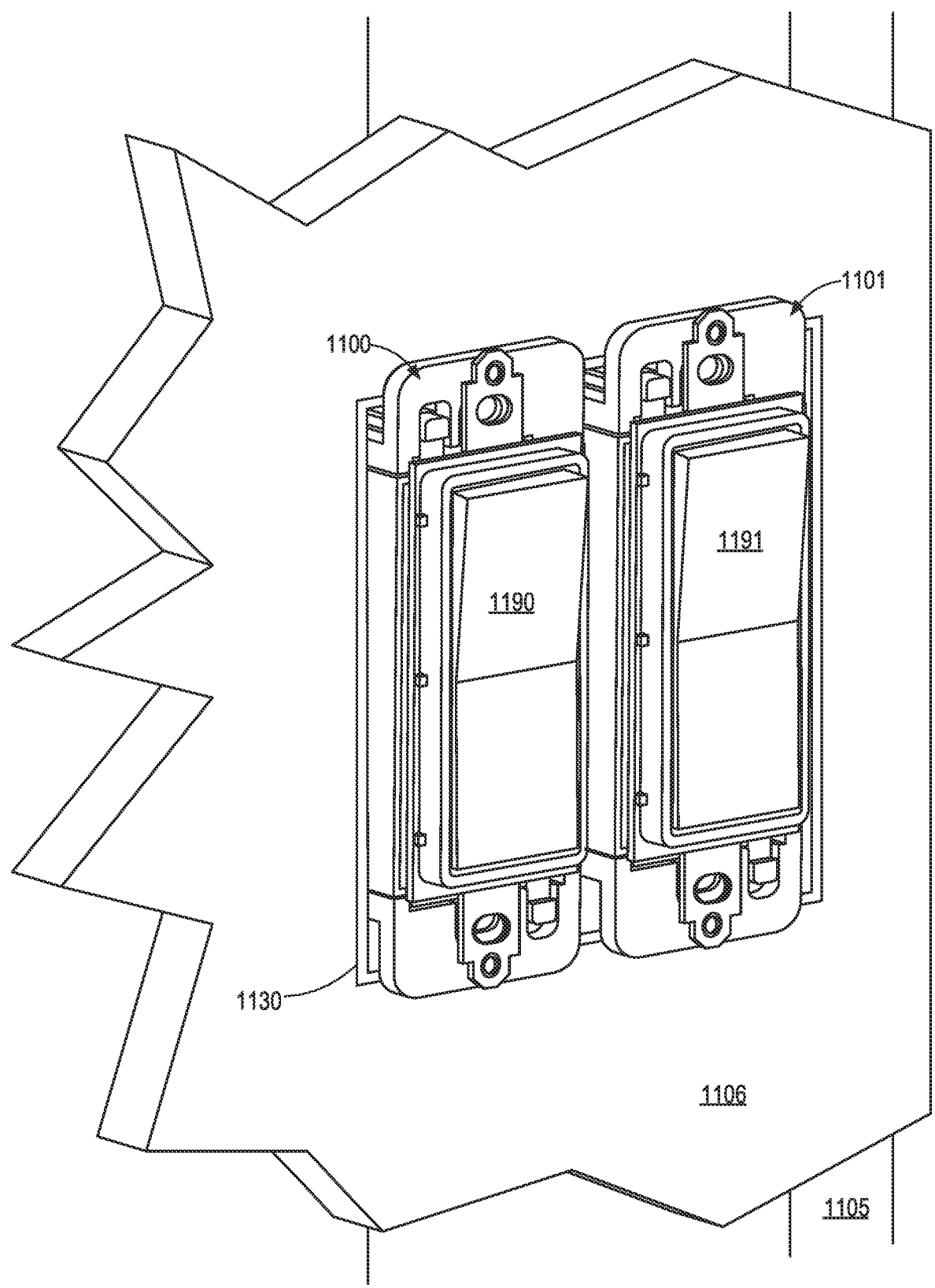
FIG. 11B illustrates the two example pluggable modular paddle switch devices installed in the example jbox interface chassis within the double-gang electrical junction box installed behind a wall, according to one embodiment.

FIG. 11B illustrates the two example pluggable modular paddle switch devices 1190 and 1191 installed in the jbox interface chassis 1100 and 1101 within the double-gang electrical junction box 1130 installed behind a wall 1106, according to one embodiment.

Figure 11C:
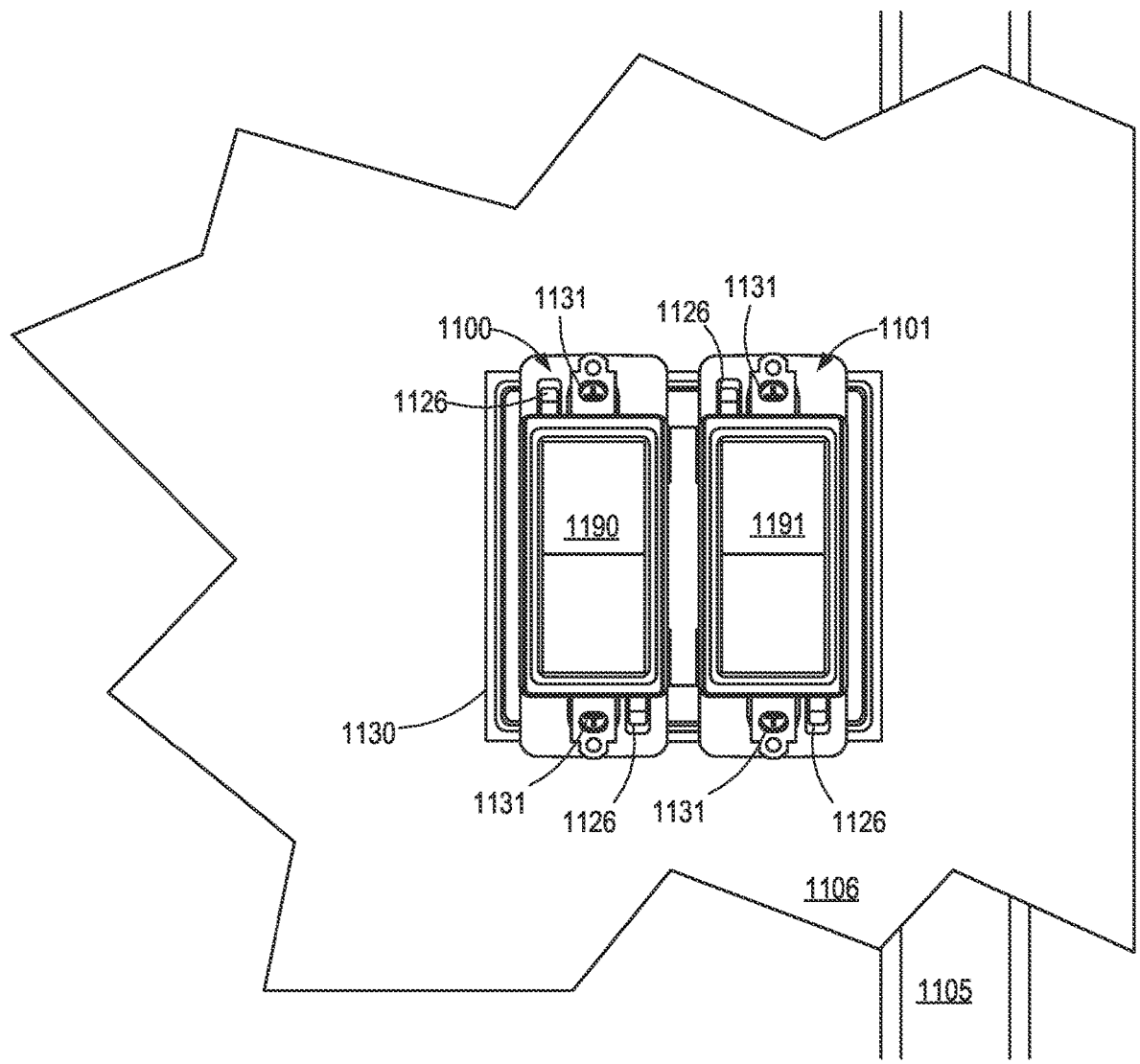
FIG. 11C illustrates a front view of the two example pluggable modular paddle switch devices installed in the example jbox interface chassis within the double-gang electrical junction box installed behind a wall, according to one embodiment.

FIG. 11C illustrates a front view of the two example pluggable modular paddle switch devices 1190 and 1191 installed in the jbox interface chassis 1100 and 1101 within the double-gang electrical junction box 1130 installed behind a wall 1106, according to one embodiment. As illustrated, each of the jbox interface chassis 1100 and 1101 are secured in a fixed position within the double-gang electrical junction box 1130 by screws 1131 that are partially visible. According to the illustrated installation, the pluggable modular paddle switch devices 1190 and 1191 may be hot-swappable and selectively removed from the jbox interface chassis 1100 and 1101 by releasing the retainer tabs 1126.

In an alternative installation, the screws 1131 may be removed and passed through the aperture in the pluggable modular paddle switch devices 1190 and 1191 and the aperture in the jbox interface chassis 1100 and 1101 before being threaded into the double-gang electrical junction box 1130. With such an installation, the pluggable modular paddle switch devices 1190 and 1191 are more securely retained. In some embodiments, special screws or other locking fastener devices may be utilized to prevent theft or malicious removal of the pluggable modular paddle switch devices 1190 and 1191 from the jbox interface chassis 1100 and 1101 and underlying double-gang electrical junction box 1130.

Figure 12C:
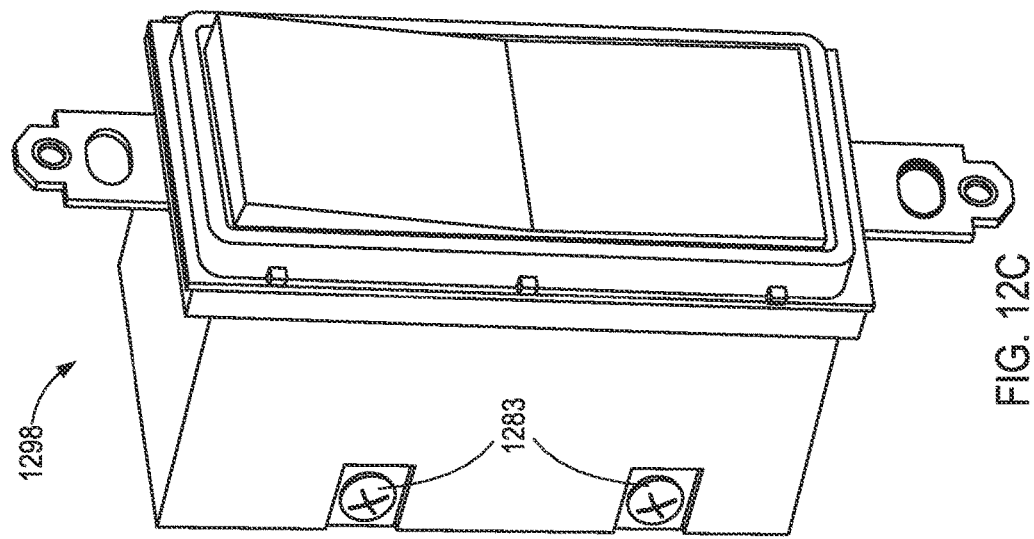
FIG. 12C illustrates an example single-gang electrical switch with side-screw terminals, according to one embodiment.
Figure 12B:
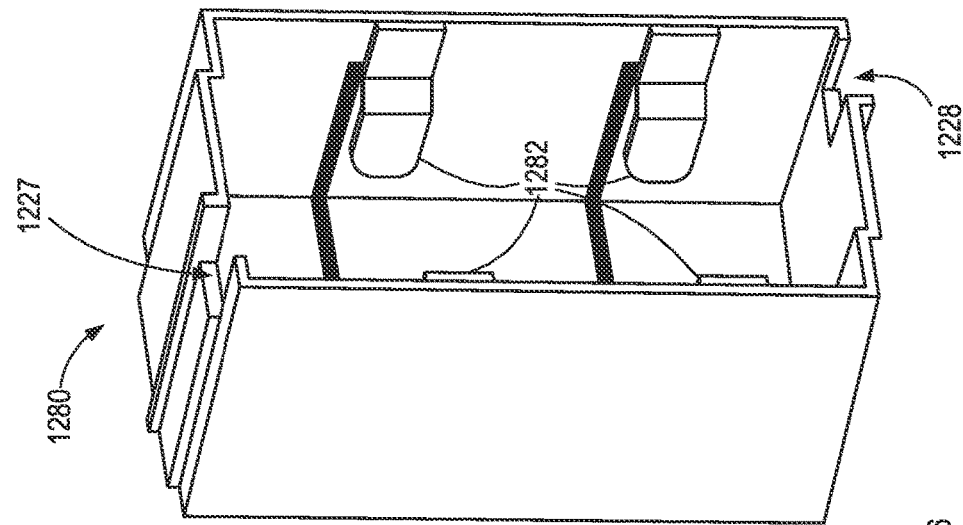
FIG. 12B illustrates an example pluggable device back with flexible conductor tabs for attachment to an electrical device with side-screw terminals, according to one embodiment.
Figure 12A:
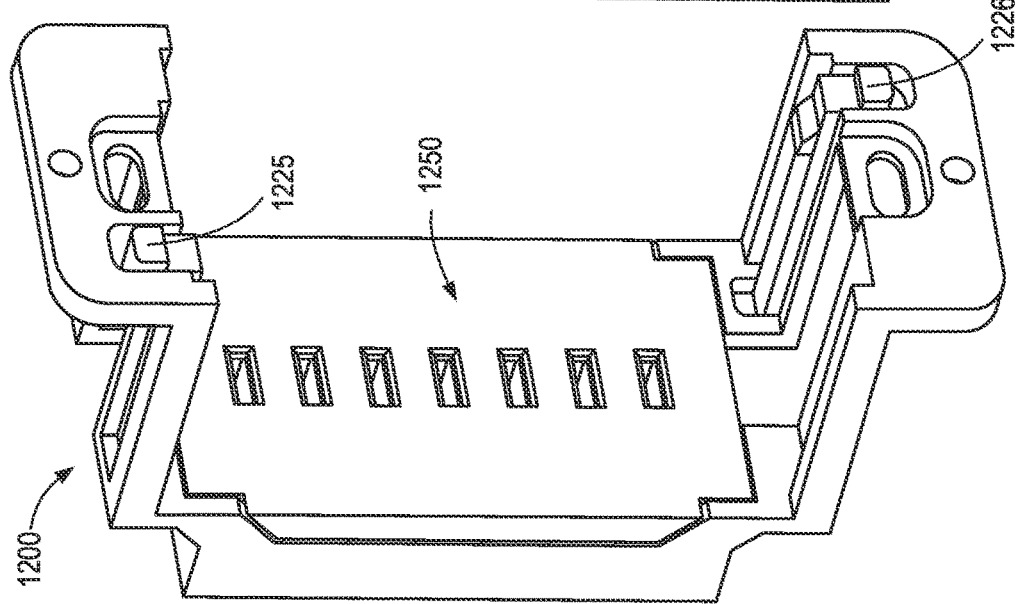
FIG. 12A illustrates an example jbox interface chassis for installation in an electrical junction box, according to one embodiment.

FIG. 12A illustrates an example jbox interface chassis 1200 for installation in an electrical junction box, according to various embodiments. As described in conjunction with other embodiments, the jbox interface chassis 1200 may include retainer tabs 1225 and 1226 to selectively retain and release an inserted pluggable modular device. The jbox interface chassis 1200 also includes a front pluggable interface 1250 to provide a hot-swappable pluggable connection between an inserted pluggable modular device and wires connected to a rear wire interface of the jbox interface chassis 1200.

FIG. 12B illustrates an example device adapter that includes a pluggable device back 1280 with flexible conductor tabs 1282 for attachment to an electrical device with side-screw terminals, according to one embodiment. As illustrated, the pluggable device back 1280 includes cutouts 1227 and 1228 to be engaged by the retainer tabs 1225 and 1226.

FIG. 12C illustrates an example single-gang electrical switch 1298 with side-screw terminals 1283, according to one embodiment. The electrical switch 1298 is an example of a legacy electrical device. As the electrical switch 1298 is inserted into the pluggable device back 1280, the flexible conductor tabs 1282 electrically connect the side terminal screws 1283 to a rear pluggable interface of the pluggable device back 1280. The rear pluggable interface of the pluggable device back 1280 may be embodied according to any of the various embodiments described herein.

Figure 13C:
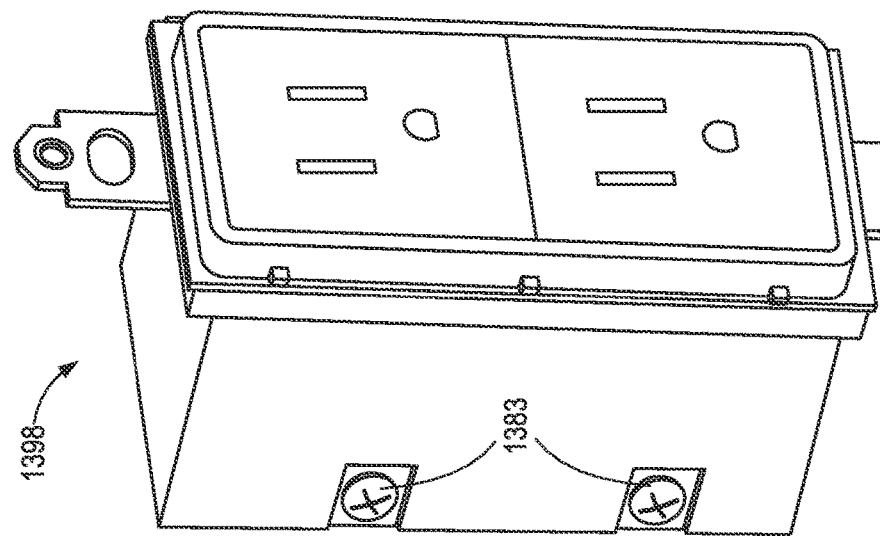
FIG. 13C illustrates an example single-gang electrical outlet receptacle with side-screw terminals, according to one embodiment.
Figure 13B:
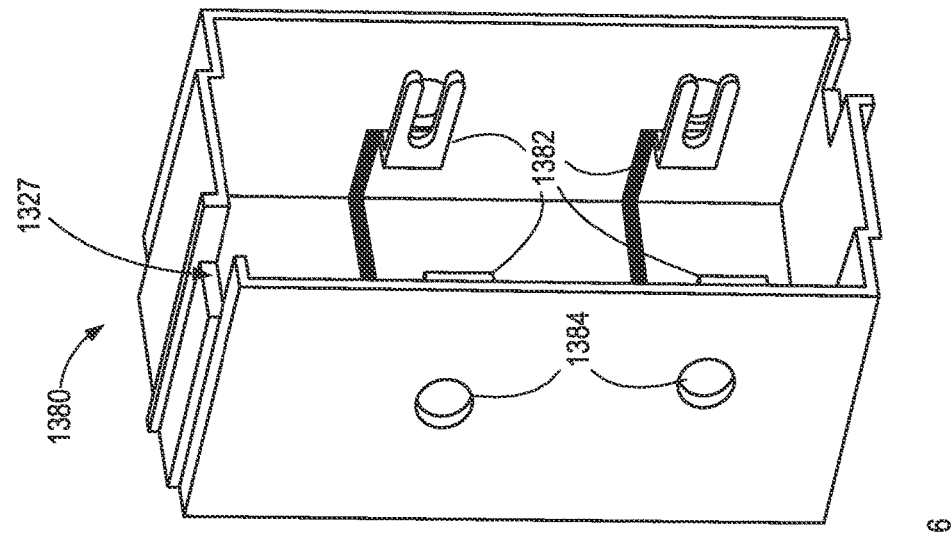
FIG. 13B illustrates an example pluggable device back with pronged conductor tabs for attachment to an electrical device with side-screw terminals, according to one embodiment.
Figure 13A:
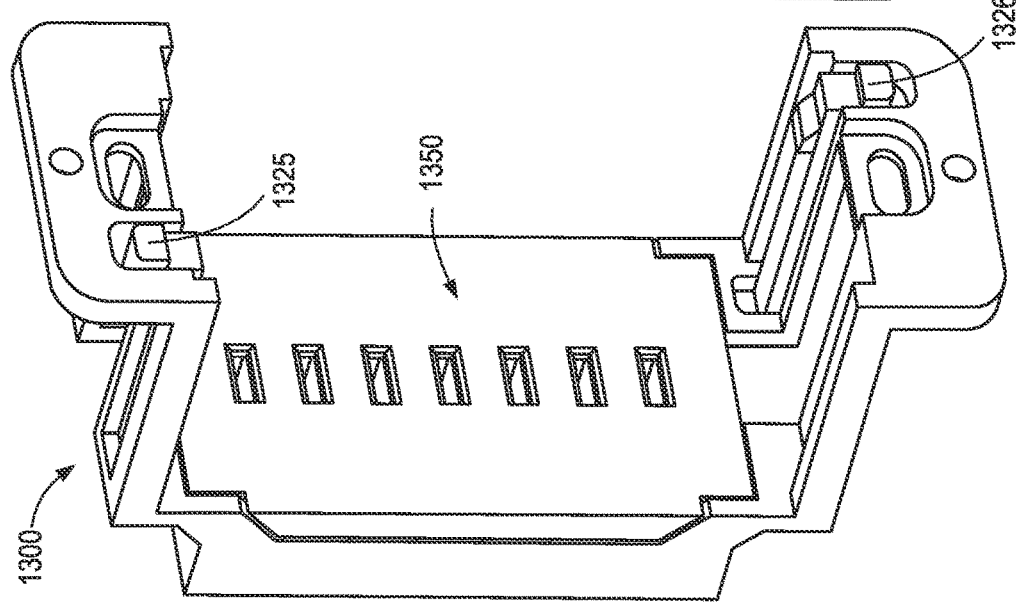
FIG. 13A illustrates an example jbox interface chassis for installation in an electrical junction box, according to one embodiment.

FIG. 13A illustrates an example jbox interface chassis 1300 for installation in an electrical junction box, according to one embodiment. Again, the jbox interface chassis 1300 includes retainer tabs 1325 and 1326 to selectively retain and release an inserted pluggable modular device. The jbox interface chassis 1300 also includes a front pluggable interface 1350 to provide a hot-swappable pluggable connection between an inserted pluggable modular device and wires connected to a rear wire interface of the jbox interface chassis 1300.

FIG. 13B illustrates an example pluggable device back 1380 with pronged conductor tabs 1382 for attachment to an electrical device with side-screw terminals, according to one embodiment. The pluggable device back 1380 includes cutouts 1327 and 1328 to be engaged by the retainer tabs 1325 and 1326. The pluggable device back 1380 also includes access holes 1384 to allow a user to tighten the side-screw terminals on an inserted electrical device.

FIG. 13C illustrates an example single-gang electrical outlet receptacle 1398 with side-screw terminals 1383, according to one embodiment. As the outlet receptacle 1398 is inserted into the pluggable device back 1380, the pronged conductor tabs 1382 engage the shafts of the partially unscrewed side-screw terminals 1383 of the pluggable device back 1380. Once inserted, a user may tighten the side-screw terminals 1383 through the access holes 1384 to fully engage the pronged conductor tabs 1382. The pronged conductor tabs 1382 electrically connect the outlet receptacle 1398 to a rear pluggable interface of the pluggable device back 1380. The rear pluggable interface of the pluggable device back 1380 may be embodied according to any of the various embodiments described herein.

Figure 14:
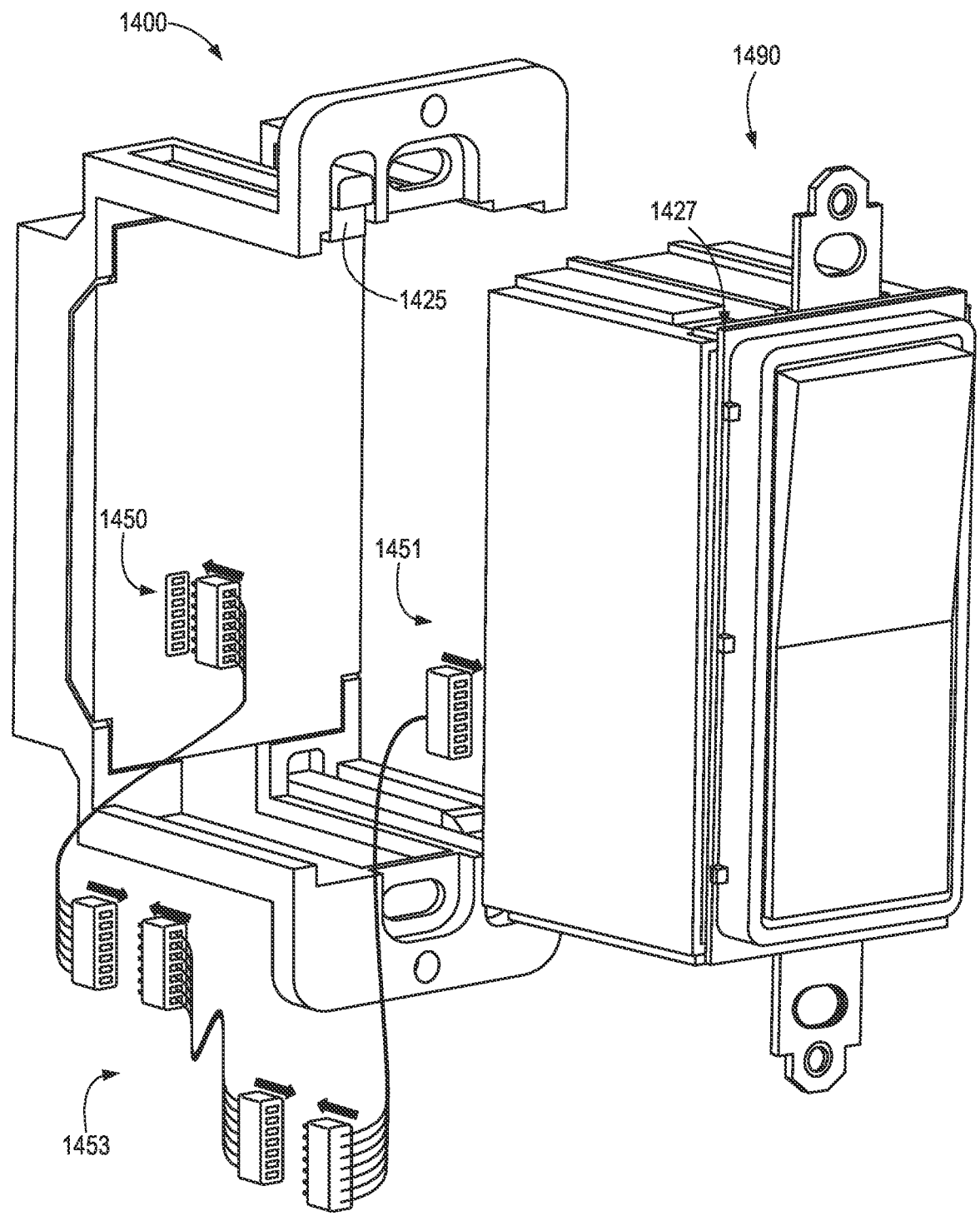
FIG. 14 illustrates an example jbox interface chassis with a multi-pin connector interface for connection to an example pluggable modular paddle switch device, according to one embodiment.

FIG. 14 illustrates an example jbox interface chassis 1400 with a multi-pin connector interface 1450 for connection to an example pluggable modular device 1490, according to one embodiment. The jbox interface chassis 1400 includes retainer tabs, including upper retainer tab 1425, to selectively retain the pluggable modular device 1490 via cutouts, including upper cutout 1427. The pluggable modular device 1490 includes a rear pluggable interface 1451 corresponding to the multi-pin connector interface 1450 of the pluggable modular device 1490. One or more cables 1453 (illustrated in three example segments) may connect the multi-pin connector interface 1450 of the jbox interface chassis 1400 to the rear pluggable interface 1451 of the pluggable modular device 1490.

Figure 15A:
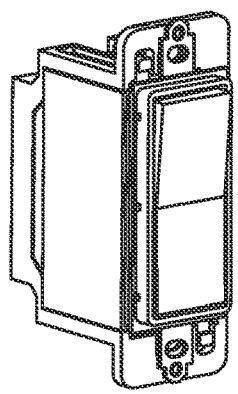
FIGS. 15A-15K illustrate various examples of pluggable modular devices for connection to jbox interface chassis, according to various embodiments.
Figure 15B:
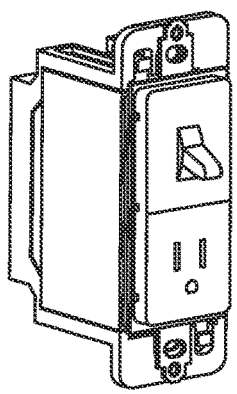

FIGS. 15A-15K illustrate various examples of pluggable modular devices for connection to jbox interface chassis, according to various embodiments. Various alternative embodiments are not illustrated, and combinations of illustrated and non-illustrated embodiments are also possible. FIG. 15A illustrates a pluggable modular paddle switch device installed in a jbox interface chassis, according to one embodiment. FIG. 15B illustrates a pluggable modular device with a switch and an outlet receptacle installed in a jbox interface chassis, according to one embodiment.

Figure 15C:
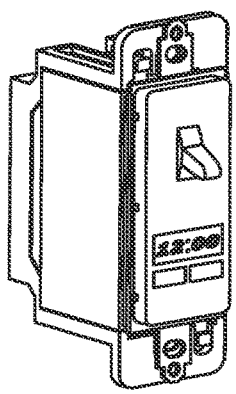
Figure 15D:
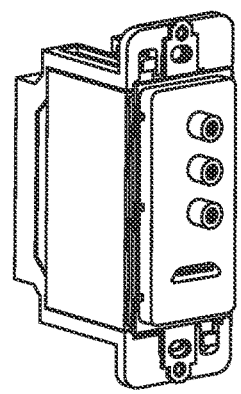
Figure 15E:
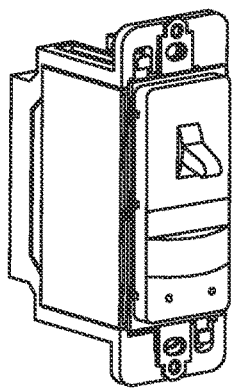

FIG. 15C illustrates a pluggable modular device with a switch and a timer installed in a jbox interface chassis, according to one embodiment. FIG. 15D illustrates a pluggable modular device with audio-video connections (RCA and HDMI ports) installed in a jbox interface chassis, according to one embodiment. FIG. 15E illustrates a pluggable modular device with a switch and a motion detector installed in a jbox interface chassis, according to one embodiment.

Figure 15F:
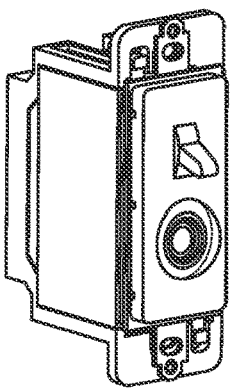
Figure 15G:
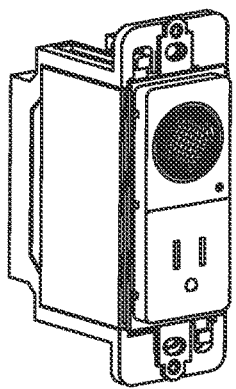
Figure 15H:
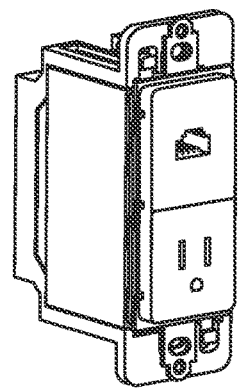
Figure 15I:
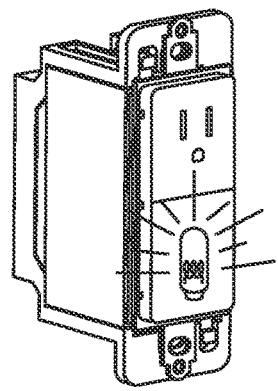

FIG. 15F illustrates a pluggable modular device with a switch and a speaker installed in a jbox interface chassis, according to one embodiment. In some embodiments, the speaker (e.g., a Bluetooth speaker) may be battery operated and removable from the pluggable modular device. The pluggable modular device may charge the speaker when it is connected thereto. FIG. 15G illustrates a pluggable modular device with a microphone and an outlet receptacle installed in a jbox interface chassis, according to one embodiment. FIG. 15H illustrates a pluggable modular device with an RJ-45 jack for communication and an outlet receptacle installed in a jbox interface chassis, according to one embodiment. FIG. 15I illustrates a pluggable modular device with an outlet receptacle and a light installed in a jbox interface chassis, according to one embodiment. In some embodiments, the light may be battery operated and removable from the pluggable modular device. The pluggable modular device may charge the light when it is connected thereto.

Figure 15J:
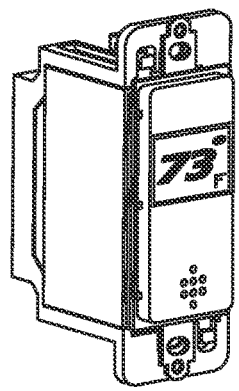
Figure 15K:
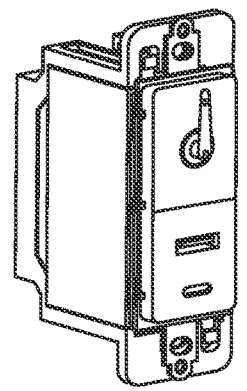

FIG. 15J illustrates a pluggable modular device with an integrated voice assistant interface that includes a microphone, speaker, and digital display, according to one embodiment. FIG. 15K illustrates a pluggable modular device with an antenna for wireless communication (e.g., Bluetooth, Zigbee, WiFi, etc.) and two different versions of USB charging ports, according to one embodiment.

Figure 16:
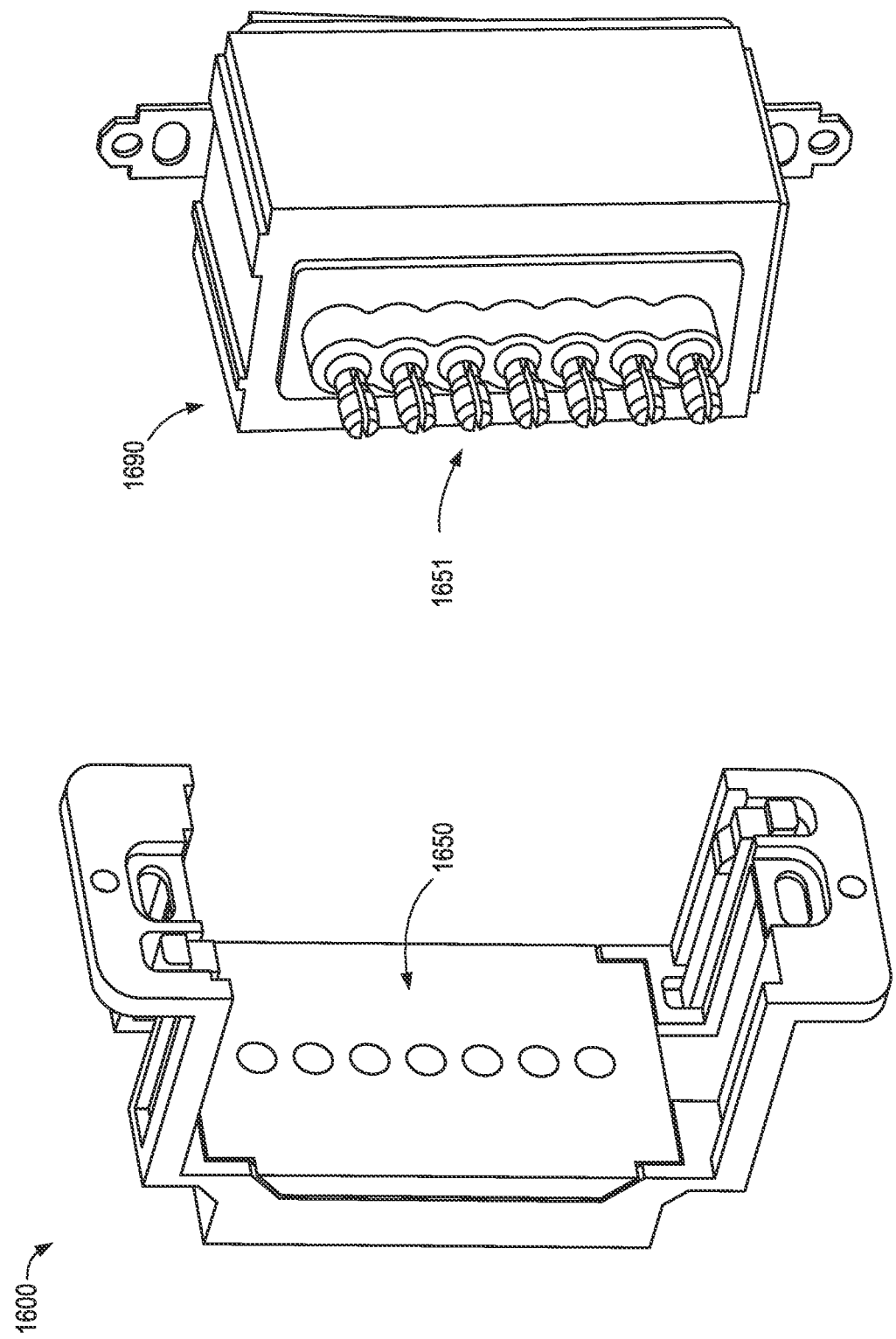
FIG. 16 illustrates an example pluggable modular device with a split-pin rear pluggable interface for installation in an example jbox interface chassis with corresponding split-pin receptacles, according to one embodiment.

FIG. 16 illustrates an example pluggable modular device 1690 with a split-pin rear pluggable interface 1651 for installation in an example jbox interface chassis 1600 with corresponding split-pin receptacles 1650, according to one embodiment.

This disclosure has been made with reference to various example embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the presently described systems, apparatuses, and methods should be understood to encompass at least the following claims, which form a part of this disclosure.

What is claimed is:

1. A jbox interface chassis, comprising: at least one fastener interface to receive at least one fastener to retain the jbox interface chassis in a fixed position within an electrical junction box; a rear wire interface to individually secure each of a plurality of wires available within the electrical junction box to the jbox interface chassis; at least one retainer tab with a protrusion to selectively: engage a retaining feature of an inserted pluggable modular device to thereby selectively retain the inserted pluggable modular device within the jbox interface chassis; and provide a release function to release the inserted pluggable modular device upon pressing the retainer tab away from the retaining feature of the inserted pluggable modular device; and a front pluggable interface to electrically connect each individually secured wire on the rear wire interface to one of a plurality of corresponding discrete pluggable ports for pluggable connection to the inserted pluggable modular device.

2. The chassis of claim 1, wherein the at least one fastener interface comprises:
   a first fastener interface to receive a first fastener; and
   a second fastener interface to receive a second fastener.

3. The chassis of claim 2, wherein each of the first and second fastener interfaces is configured to receive a screw that is screwed into the electrical junction box to retain the jbox interface chassis in the fixed position within the electrical junction box.

4. The chassis of claim 1, wherein the front pluggable interface comprises a plurality of slots configured to receive corresponding blades of a pluggable modular device.

5. The chassis of claim 4, wherein a front surface of the front pluggable interface is electrically insulated such that a user can touch the front pluggable interface with a finger without making an electrical connection between any of the discrete pluggable ports.

6. The chassis of claim 1, wherein the retaining feature of the inserted pluggable modular device comprises a cutout in a casing of the inserted pluggable modular device.

7. A pluggable modular device, comprising: an external-facing electrical device; a casing with a rear pluggable interface to provide electrical connections between the external-facing electrical device and a front pluggable interface of a jbox interface chassis; and at least one retaining feature on the casing to interact with at least one retaining tab of the jbox interface chassis as the casing is inserted within the jbox interface chassis, wherein the at least one retaining feature on the casing operates in conjunction with the at least one retaining tab of the jbox interface chassis to selectively: automatically retain the inserted pluggable modular device within the jbox interface chassis as the pluggable modular device is inserted within the jbox interface chassis, and provide a release function to release the inserted pluggable modular device upon disengagement of the retaining tab from the retaining feature.

8. A pluggable modular system, comprising: a jbox interface chassis to be fastened within an electrical junction box, wherein the jbox interface chassis includes: a rear wire interface to individually secure each of a plurality of wires available within the electrical junction box to the jbox interface chassis; at least one retainer tab with a protrusion to selectively retain and release an inserted pluggable modular device within the jbox interface chassis; and a front pluggable interface to electrically connect each individually secured wire on the rear wire interface to one of a plurality of corresponding discrete pluggable ports for pluggable connection to each inserted pluggable modular device; and a plurality of hot-swappable pluggable modular devices to be selectively installed and retained and released and removed from the jbox interface chassis without wiring modification, each hot-swappable pluggable modular device comprising: an external-facing electrical device; a casing with a rear pluggable interface to provide electrical connections between the external-facing electrical device and the front pluggable interface of the jbox interface chassis; and at least one retaining feature on the casing to interact with the at least one retaining tab of the jbox interface chassis as the casing is inserted within the jbox interface chassis, wherein the protrusion of the at least one retainer tab of the jbox interface chassis operates in conjunction with the at least one retaining feature of each hot-swappable pluggable modular device to: retain, automatically upon insertion, each hot-swappable pluggable modular device inserted within the box interface chassis, and release each hot-swappable pluggable modular device in response to the at least one retainer tab being pressed to disengage the protrusion from the at least one retaining feature on the casing of the hot-swappable pluggable modular device.

9. The system of claim 8, wherein the front pluggable interface of the jbox interface chassis comprises a plurality of slots,
   wherein the rear pluggable interface of each pluggable modular device comprises a plurality of blades, and
   wherein each of the plurality of blades of each pluggable modular device is configured to enter and electrically connect with one of the plurality of slots of the jbox interface chassis as the pluggable modular device is inserted into the jbox interface chassis.

10. The system of claim 8, wherein the at least one retaining feature of each of the pluggable modular devices comprises a cutout in the casing thereof.

* * * * *